United States Patent
Kelso et al.

(10) Patent No.: US 11,673,134 B2
(45) Date of Patent: Jun. 13, 2023

(54) TRANS-INTERFACIAL MAGNETIC SEPARATION

(71) Applicant: Northwestern University, Evanston, IL (US)

(72) Inventors: David M. Kelso, Wilmette, IL (US); Abhishek K. Agarwal, Evanston, IL (US); Sally M. McFall, Evanston, IL (US); Tom Westberg, Evanston, IL (US); Matthew Austin Butzler, Evanston, IL (US); Jennifer L. Reed, Evanston, IL (US)

(73) Assignee: Northwestern University, Evanston, IL (US)

( * ) Notice: Subject to any disclaimer, the term of this patent is extended or adjusted under 35 U.S.C. 154(b) by 158 days.

(21) Appl. No.: 16/618,698

(22) PCT Filed: Jun. 6, 2018

(86) PCT No.: PCT/US2018/036348
§ 371 (c)(1),
(2) Date: Dec. 2, 2019

(87) PCT Pub. No.: WO2018/226891
PCT Pub. Date: Dec. 13, 2018

(65) Prior Publication Data
US 2021/0146351 A1    May 20, 2021

Related U.S. Application Data

(60) Provisional application No. 62/515,876, filed on Jun. 6, 2017.

(51) Int. Cl.
  *G01N 35/00* (2006.01)
  *B01L 3/00* (2006.01)
  *B01L 7/00* (2006.01)

(52) U.S. Cl.
  CPC ............ *B01L 3/502* (2013.01); *B01L 7/52* (2013.01); *G01N 35/0098* (2013.01);
  (Continued)

(58) Field of Classification Search
  CPC .... B01L 3/502; B01L 3/50; B01L 2200/0647; B01L 2400/043; B01L 7/52;
  (Continued)

(56) References Cited

U.S. PATENT DOCUMENTS

| 6,355,792 B1 | 3/2002 | Michelsen et al. |
| 8,017,340 B2 | 9/2011 | Collier et al. |

(Continued)

FOREIGN PATENT DOCUMENTS

| CN | 101010592 | 8/2013 |
| CN | 103384565 A | 11/2013 |
| WO | WO 2011/076860 A1 | 6/2011 |

OTHER PUBLICATIONS

International Search Report and Written Opnion for PCT/US18/36348. dated Oct. 3, 2018. 17 pages.

(Continued)

*Primary Examiner* — Melanie Brown
*Assistant Examiner* — Jennifer H. Tieu
(74) *Attorney, Agent, or Firm* — Casimir Jones SC; David W. Staple

(57) ABSTRACT

Provided herein are devices that facilitate the magnetic separation of an analyte from a sample, and methods of use thereof. In particular embodiments, devices and methods are provided for the trans-interfacial magnetic separation (TIMS) of analytes from a sample.

9 Claims, 26 Drawing Sheets

(52) U.S. Cl.
CPC ............... *B01L 2200/0647* (2013.01); *B01L 2200/0684* (2013.01); *B01L 2200/10* (2013.01); *B01L 2200/16* (2013.01); *B01L 2300/042* (2013.01); *B01L 2300/0829* (2013.01); *B01L 2300/165* (2013.01); *B01L 2400/043* (2013.01)

(58) Field of Classification Search
CPC ......... B01L 2200/0684; B01L 2200/10; B01L 2200/16; B01L 2300/042; B01L 2300/0829; B01L 2300/165; B01L 2300/166; B01L 7/525; G01N 35/0098; G01N 33/00; G01N 33/54326
See application file for complete search history.

(56) References Cited

U.S. PATENT DOCUMENTS

| | | | |
|---|---|---|---|
| 8,048,633 | B2 | 11/2011 | Collier et al. |
| 8,206,918 | B2 | 6/2012 | Kelso et al. |
| 8,349,274 | B2 | 1/2013 | Prins et al. |
| 8,440,150 | B2 | 5/2013 | Den Dulk et al. |
| 8,603,416 | B2 | 12/2013 | Beebe et al. |
| 8,728,410 | B2 | 5/2014 | Beebe et al. |
| 8,883,487 | B2 | 11/2014 | Collier et al. |
| 9,272,290 | B2 | 3/2016 | Irmscher et al. |
| 2007/0110613 | A1 | 5/2007 | Pachl et al. |
| 2011/0065209 | A1 | 3/2011 | Heil et al. |
| 2012/0295366 | A1* | 11/2012 | Zilch ............... B01L 3/502761 422/69 |
| 2013/0183678 | A1 | 7/2013 | Haselton |
| 2014/0065622 | A1 | 3/2014 | Beebe et al. |
| 2014/0065654 | A1 | 3/2014 | Beebe et al. |
| 2014/0190894 | A1 | 7/2014 | Beebe et al. |
| 2014/0212963 | A1 | 7/2014 | Beebe et al. |
| 2014/0272937 | A1* | 9/2014 | Haselton ............ G01N 35/0098 435/5 |
| 2014/0273056 | A1 | 9/2014 | Beebe et al. |
| 2015/0196907 | A1 | 7/2015 | Beebe et al. |
| 2016/0195523 | A1 | 7/2016 | Chatterjee et al. |
| 2016/0202157 | A1 | 7/2016 | Fawcett et al. |

OTHER PUBLICATIONS

European Search Report for PCT/US2018/036348. dated Oct. 26, 2020. 14 pages.

Adams et al., Design criteria for developing low-resource magnetic bead assays using surface tension valves. Biomicrofluidics. Jan. 18, 2013;7(1):14104. 15 pages.

Berry et al., AirJump: Using Interfaces to Instantly Perform Simultaneous Extractions. ACS Appl Mater Interfaces. Jun. 22, 2016;8(24):15040-5.

Berry et al., HIV viral RNA extraction in wax immiscible filtration assisted by surface tension (IFAST) devices. J Mol Diagn. May 2014;16(3):297-304.

Berry et al., One-step purification of nucleic acid for gene expression analysis via Immiscible Filtration Assisted by Surface Tension (IFAST). Lab Chip. May 21, 2011;11 (10):1747-53.

Berry et al., Streamlining immunoassays with immiscible filtrations assisted by surface tension. Anal Chem. Jul. 3, 2012;84(13):5518-23.

Bitting et al., Automated Device for Asynchronous Extraction of RNA, DNA, or Protein Biomarkers from Surrogate Patient Samples. J Lab Autom. Dec. 2016;21(6):732-742.

Blumenschein et al., Magnetic particles as liquid carriers in the microfluidic lab-in-tube approach to detect phase change. ACS Appl Mater Interfaces. Jun. 11, 2014;6(11):8066-72.

Bordelon et al., A magnetic bead-based method for concentrating DNA from human urine for downstream detection. PLoS One. Jul. 8, 2013;8(7):e68369. 9 pages.

Casavant et al., Efficient sample preparation from complex biological samples using a sliding lid for immobilized droplet extractions. Anal Chem. Jul. 1, 2014;86(13):6355-62.

Den Dulk et al., Magneto-capillary valve for integrated purification and enrichment of nucleic acids and proteins. Lab Chip. Jan. 7, 2013;13(1):106-18.

Hudson et al., Engineered antibodies. Nat Med. Jan. 2003;9(1):129-34.

Kistrup et al., Liquid carry-over in an injection moulded all-polymer chip system for immiscible phase magnetic bead-based solid-phase extraction. J.Magn. Magn. Mater. 2015. 380: 191-196.

Shikida et al., Using wettability and interfacial tension to handle droplets of magnetic beads in a micro-chemical-analysis system. Sens. Actuators B:Chemical. 2006. 113 (1);563-569.

Shin et al., 002.6 A low-cost mobile naat platform for chlamydia trachomatis. Sexually Transmitted Infections 91.Suppl 2. 2015: A29-A30.

Sur et al., Immiscible phase nucleic acid purification eliminates PCR inhibitors with a single pass of paramagnetic particles through a hydrophobic liquid. J Mol Diagn. Sep. 2010;12(5):620-8.

Troiano et al., Effect of surfactants on carryover liquid volume in immiscible phase magnetic bead separation. Colloids and Surfaces A: Physicochemical and Engineering Aspects. 2017, vol. 513: 188-195.

Uehara et al., A Rapid and Automated Device for Purifying Nucleic Acids. Anal Sci. 2016;32(3):371-4.

Zhang et al., Magnetic digital microfluidics—a review. Lab Chip. Mar. 14, 2017;17(6):994-1008.

Search Report for Chinese Patent Application No. 202111135982.1. dated Aug. 4, 2022, 10 pages.

* cited by examiner

Modified atoll (thicker, ID radius)

(A)

(B)

(C)

Cartridge is flat (planar)

Cartridge is rotated (e.g., 90°)

TRANS-INTERFACIAL MAGNETIC SEPARATION

CROSS-REFERENCE TO RELATED APPLICATIONS

The present invention is a § 371 U.S. National Entry application of PCT/US2018/036348, filed Jun. 6, 2018, which claims the priority benefit of U.S. Provisional Patent Application 62/515,876, filed Jun. 6, 2017, each of which is incorporated by reference in its entirety.

FIELD

Provided herein are devices that facilitate the magnetic separation of an analyte from a sample, and methods of use thereof. In particular embodiments, devices and methods are provided for the trans-interfacial magnetic separation (TIMS) of analytes from a sample.

BACKGROUND

The unavailability of low-cost and efficient options for the purification and/or isolation of target analytes from biological and environmental samples in the field or in point-of-care facilities presents a significant limitation to many potential diagnostic and environmental testing solutions.

SUMMARY

Provided herein are devices that facilitate the magnetic separation of an analyte from a sample, and methods of use thereof. In particular embodiments, devices and methods are provided for the trans-interfacial magnetic separation (TIMS) of analytes from a sample.

In some embodiments, provided herein are analyte purification devices, comprising: (a) first and second chambers, each comprising a closed bottom and a top opening, the chambers capable of containing a volume of liquid, the top openings of the chambers residing along a planar surface; (b) a transfer surface, disposed above the planar surface, having a proximal side oriented toward the planar surface and a distal side oriented away from the planar surface, and creating an air gap between the planar surface and the proximal side of the transfer surface; (c) an airlock chamber, disposed along the planar surface between the first and second chambers, wherein the airlock chamber interrupts a path along the planar surface between the two chambers; wherein the device is dimensioned such that liquid that exits either of the first and second chambers cannot cross the airlock and will create a liquid/air interface between the planar surface and the proximal side of the transfer surface at the edge of the airlock; wherein the airlock is of sufficient size to prevent contact between the liquid/air interface created by liquid from the first and second chambers on either side of the airlock. In some embodiments, the first and second chambers and the airlock are aligned linearly along the planar surface. In some embodiments, the proximal side of the transfer surface comprises a thin hydrophobic film or coating. In some embodiments, devices further comprise a magnet, positioned adjacent to the distal side of the transfer surface. In some embodiments, the magnet is movable laterally along the distal side of the transfer surface, and is capable of being separately positioned above the first and second chambers and the airlock on the transfer surface. In some embodiments, a magnetic field produced by the magnet is applied to the first or second chamber when the magnet is in an adjacent position, but is reduced within the chamber when the magnet is in a distant position.

In some embodiments, provided herein are analyte purification systems comprising a device (e.g., cartridge) described herein (e.g., the preceding paragraph and elsewhere herein) and buffer solutions within the first and second chambers. In some embodiments, the buffer solution in the first chamber comprises paramagnetic particles (PMPs). In some embodiments, the PMPs display a capture agent on their surface. In some embodiments, the capture agent is a nucleic acid, antibody or antibody fragment, or an affinity agent. In some embodiments, the capture agent is bound to an analyte. In some embodiments, the buffer in the first chamber is a hydridization buffer that facilitates binding of the analyte to the capture agent.

In some embodiments, provided herein are methods comprising: (a) positioning the magnet of a system described herein (e.g., the preceding paragraph and elsewhere herein) above the first chamber, thereby collecting the PMPs against the proximal side of the transfer surface above the first chamber; (b) moving the magnetic field laterally along the transfer surface, thereby moving the PMPs along the proximal side of the transfer surface, through the air gap, and positioning the PMPs above the second chamber; and (c) releasing the PMPs into the buffer contained in the second chamber. In some embodiments, the second buffer is a wash buffer. In some embodiments, moving the magnetic field laterally along the transfer surface comprises: (i) moving the magnetic field along the path between the first and second chambers to bring the collected PMPs near or adjacent to the air/liquid interface between the liquid of the first chamber and the airlock; (ii) reducing or eliminating the magnetic field experienced by the PMPs; (iii) recreating the magnetic field within the air gap; (iv) allowing the PMPs pelleted within the liquid to stream out of the liquid into the air gap.

In some embodiments, provided herein are analyte purification devices, comprising: (a) first and second chambers, each comprising a closed bottom and a top opening, the chambers capable of containing a volume of liquid; (b) a channel that connects the first and second chambers, wherein the channel connects to the first chamber near the bottom of the first chamber, and wherein the channel connects to the second chamber near the top of the second chamber, such that when the device is in a planar orientation, liquid must flow upward through the channel to move from the first chamber to the second chamber; (c) a vent connecting the first chamber to the exterior of the device, wherein the vent connects to the first chamber near the top of the first chamber; and (d) a plunger cap, wherein the plunger cap fits within the top opening of the first chamber and seals the top opening of the first chamber, but does not seal the vent to the first chamber, wherein upon manually depressing the plunger cap further into the first chamber, the plunger cap also seals the vent. In some embodiments, when the device is in a non-planar orientation, liquid may flow through the channel to move from the first chamber to the second chamber without flowing uphill.

In some embodiments, provided herein are analyte purification systems comprising a device (e.g., cartridge) described herein (e.g., the preceding paragraph and elsewhere herein), and a first heater positioned adjacent to the first chamber. In some embodiments, the first heater is configured to heat materials within the first chamber to a temperature over 90° C. In some embodiments, systems further comprise a second heater positioned adjacent to the second chamber. In some embodiments, the second heater is configured to heat materials within the second chamber to a temperature of 50-75° C. In some embodiments, systems further comprise a sample within the first chamber. In some embodiments, the sample is a biological sample comprising cells. In some embodiments, systems further comprise a lysis buffer within the first chamber. In some embodiments, the sample comprises an analyte of interest. In some embodiments, systems further comprise paramagnetic particles (PMPs) in the second chamber. In some embodiments, the PMPs are dried to the walls and/or bottom of the second chamber. In some embodiments, the PMPs display a capture agent with affinity for the analyte of interest.

In some embodiments, provided herein are methods comprising: (a) adding a sample to a the first chamber of a system described herein (e.g., in the preceding paragraph and elsewhere herein), where the device is in the planar orientation; (b) sealing the opening of the first chamber with the plunger cap; (c) incubating the sample in the first chamber; (d) reorienting the device into a non-planar orientation; (e) depressing the plunger cap to transfer the sample from the first chamber to the second chamber; and (f) incubating the sample in the second chamber. In some embodiments, the sample comprises cells and lysis buffer. In some embodiments, methods further comprise heating the sample.

In some embodiments, provided herein are analyte purification devices, comprising: (a) a cell lysis chamber, the cell lysis chamber comprising a closed bottom and an open top, the cell lysis chamber being capable of containing a volume of liquid; (b) an analyte capture chamber, the analyte capture chamber comprising a closed bottom and an open top, the cell lysis chamber being capable of containing a volume of liquid; (c) a transfer channel connecting the cell lysis chamber to the analyte capture chamber, wherein the transfer channel connects to the cell lysis chamber near the bottom of the cell lysis chamber, wherein the transfer channel connects to the analyte capture chamber near the top of the analyte capture chamber, such that when the device is in a planar orientation, liquid must flow upward through the transfer channel to move from the cell lysis chamber to the analyte capture chamber, wherein when the device is in a non-planar orientation, liquid may flow through the channel to move from the lysis chamber to the analyte capture chamber without flowing uphill; (d) a vent connecting the cell lysis chamber to the exterior of the device, wherein the vent connects to the cell lysis chamber near the top of the cell lysis chamber; (e) a plunger cap, wherein, when the plunger cap is in a first position, the plunger cap seals the top opening of the cell lysis chamber but does not seal the vent to the cell lysis chamber, and wherein upon manually depressing the plunger cap further into the cell lysis chamber, the plunger cap also seals the vent; (0 an wash chamber, the wash capture chamber comprising a closed bottom and an open top, the wash chamber being capable of containing a volume of liquid, the bottom of the wash chamber comprising a shallow portion and a deep portion, wherein a volume of liquid will reside in the deep portion of the bottom of the wash chamber when the device is in the planar orientation, and wherein the volume of liquid will reside in the shallow portion of the bottom of the wash chamber when the device is in a non-planar orientation; (g) an airlock chamber, disposed along the planar surface between the analyte capture chamber and wash chamber, wherein the airlock chamber interrupts a transfer path along the planar surface between the two chambers; (h) a spacer layer, wherein the spacer layer sits above the planar surface an comprises cutouts approximating the peripheries of the analyte capture chamber, the airlock chamber, and the wash chamber, and defining the sides of the transfer path from the analyte capture chamber to the wash chamber; and (i) a transfer surface, disposed above the space layer, having a proximal side oriented toward the planar surface and a distal side oriented away from the planar surface, and creating an air gap above the analyte capture chamber, the airlock chamber, the wash chamber, and the transfer path, between the planar surface and the proximal side of the transfer surface. In some embodiments, the planar surface comprises a film (e.g., base layer) placed atop the cartridge comprising the chambers. In some embodiments, the device is dimensioned such that liquid that exits the analyte capture chamber though the top opening of the chamber can travel along the transfer path but cannot cross the airlock and will create a first liquid/air interface between the planar surface and the proximal side of the transfer surface at the edge of the airlock, and wherein liquid that exits the wash chamber though the top opening of the chamber can travel along the transfer path but cannot cross the airlock and will create a second liquid/air interface between the planar surface and the proximal side of the transfer surface at the edge of the airlock. In some embodiments, the airlock is of sufficient size to prevent contact between the first liquid/air interface and the second liquid/air interface. In some embodiments, the analyte capture chamber, the shallow bottom of the wash chamber, and the airlock are aligned linearly along transfer path.

In some embodiments, provided herein are systems comprising an analyte purification device described herein (e.g., the preceding paragraph and elsewhere), and further comprising: (i) a first heater positioned adjacent to the lysis chamber, wherein the first heater is configured to heat materials within the lysis chamber to a temperature over 90° C.; (ii) a second heater positioned adjacent to the analyte capture chamber, wherein the second heater is configured to heat materials within the analyte capture chamber to a temperature of 50-75° C.; and (iii) a magnet, positioned on the distal side of the transfer surface, wherein the magnet is movable laterally along the distal side of the transfer surface, and is capable of being separately positioned along the transfer path, above the analyte capture chamber, airlock chamber, and wash chamber, wherein a magnetic field produced by the magnet is applied to the analyte capture chamber, airlock chamber, and wash chamber when the magnet is in an adjacent position, but is reduced when the magnet is in a distant position.

In some embodiments, provided herein are methods comprising: (a) providing a system described herein (e.g., the preceding paragraph and elsewhere); wherein the system further comprises: (i) a wash buffer in the wash chamber, and (ii) paramagnetic particles (PMPs) dried to the walls and/or bottom of the analyte capture chamber, wherein the PMPs display an analyte capture agent on their surface; (b) placing the system in a planar orientation; (c) adding a sample to a the lysis chamber, wherein the sample comprises the analyte and a lysis buffer; (d) sealing the opening of the lysis chamber with the plunger cap; (e) incubating the sample in the lysis chamber at a first temperature to lyse cells within the sample; (f) reorienting the device into a non-planar orientation, whereby reorienting the device allows the wash buffer to flow from the wash chamber into the transfer path and to form the second liquid/air interface; (g) depressing the plunger cap to transfer the sample from the lysis chamber to the analyte capture chamber, wherein the non-planar orientation of the device allows the liquid to flow from the cell lysis chamber into the transfer path and to form the first liquid/air interface; (h) reorienting the device into the planar orientation; (i) incubating the sample in the analyte capture chamber at a second temperature to resuspend the PMPs and the capture the analyte by the analyte capture agent; (j) positioning the magnet above the analyte capture chamber, thereby collecting the PMPs against the proximal side of the transfer surface; (k) moving the magnetic field along the transfer path to bring the collected PMPs near or adjacent to the first air/liquid interface between the liquid of the analyte lysis chamber and the airlock; (l) reducing or eliminating the magnetic field experienced by the PMPs; (m) recreating the magnetic field within the air gap; (n) allowing the collected PMPs to stream out of the liquid into the air gap; (o) moving the magnetic field across the second liquid/air interface thereby dragging the PMPs into the liquid of wash buffer liquid; and (p) releasing the PMPs into the buffer contained in the wash chamber. In other embodiments, rather than the PMPs being) dried to the walls and/or bottom of the analyte capture chamber, dried to the wall/bottom of the wash chamber, when the wash reagent is released in the wash chamber, the PMPs can be moved by magnet from the wash chamber into the analyte capture chamber (e.g., after the sample has been transferred from the lysis chamber to the analyte capture chamber).

In some embodiments, provided herein are devices comprising: (a) multiple chambers (e.g., 2, 3, 4, 5, 6, 7, 8, 9, 10), each comprising a closed bottom (e.g., permanently sealed or sealed by a removable cap, lip, or other closure) and a top opening, the chambers capable of containing a volume of liquid, the top openings of the chambers residing along a planar surface; (b) raised atolls, sitting atop the planar surface, having an outer edge and a top surface with a defined shape and dimensions (width and height), and surrounding the perimeter of the top openings of each of the multiple chambers; and (c) a transfer surface, disposed above the planar surface, having a proximal side oriented toward the planar surface and chambers and a distal side oriented toward the exterior of the device, and creating an air gap of distance $G_h$ above the top of the atolls; wherein, upon inversion of the device, gravity pulls liquid within the chambers out through the top openings of the chambers, but surface tension and capillary forces prevent the liquid from flowing beyond the outer edge of the raised atolls, thereby creating pinned pools of liquid around each chamber opening; and wherein adjacent chambers are sufficiently spaced to prevent contact between the pinned pools of liquid around each chamber opening, thereby creating an air gap of distance $A_g$ between the pinned pools of liquid.

In some embodiments, the raised atolls surround the top of the chamber openings and are of the same shape but with a larger width or diameter. In some embodiments, the chamber openings are circular and the raised atolls are ring-shaped. In some embodiments, the raised atolls and the chamber openings are not the same shape. In some embodiments, the chamber openings and/or the atolls are asymmetric. In some embodiments, the atolls are rectangular, oval, hour-glass, or other shapes. In some embodiments, the atolls are attached to a surface of the device. In some embodiments, the atolls are part of the surface of the device. In some embodiments, the raised atolls comprise a rounded inner edge. In some embodiments, the multiple chambers are aligned linearly along the planar surface. In some embodiments, pinned pools of liquid form around each chamber opening upon inversion of the device when the chamber contain a liquid with a viscosity between 0.5 and 15 centipoises (e.g., 0.5, 1, 2, 3, 4, 5, 6 7, 8, 9, 10, 11, 12, 13, 14, 15, or ranges therebetween). In some embodiments, the proximal side of the transfer surface comprises a thin film (e.g., with hydrophobic coating (e.g., a patterned hydrophobic coating)). In some embodiments, dimensions are selected to optimize the air gap for use with a particular liquid having a known viscosity.

In some embodiments, devices, systems and methods herein comprise magnetic fields generated from above or below a chamber to draw PMPs out of the chamber or place PMPs into a chamber, respectively. In some embodiments, a magnetic field is generated by placing a magnet at a desired location.

In some embodiments, devices further comprise a magnet positioned adjacent to the distal side of the transfer surface. In some embodiments, the magnet is movable laterally along the distal side of the transfer surface (or on an arc, or along a different defined path, depending on the arrangement of the chambers), and is capable of being separately positioned above each of the chambers on the transfer surface. In some embodiments, the magnet is capable of being raised and lowered above one or more of the multiple chambers. In some embodiments, a magnetic field produced by the magnet is applied to the chamber when the magnet is in the lowered position, but is reduced within the chamber when the magnet is in the raised position.

In some embodiments, devices further comprise a magnet positioned beneath one or more of the chambers. In some embodiments, the magnet beneath the chambers is movable laterally and is capable of being separately positioned beneath each of the chambers. In some embodiments, the magnet beneath the chambers is capable of being raised and lowered beneath one or more of the multiple chambers. In some embodiments, a magnetic field produced by the magnet beneath the chambers is applied to the chamber when the magnet is in the raised position, but is reduced within the chamber when the magnet is in the lowered position.

In some embodiments, devices further comprise one or more temperature-control regions (e.g., heaters and/or coolers) to facilitate resuspension of reagents, binding/release of analyte from PMPs, etc. Temperature control regions may reside along the length of a chamber, along a portion of the transfer surface, etc. In some embodiments, devices comprise one or more thermoregulation elements (e.g., heater and/or cooler). In some embodiments, devices comprise a heater in proximity to a sample mixing chamber and configured to heat the contents of the chamber. In some embodiments, heating the contents of the mixing chamber facilitates mixing. In some embodiments, a heater is cylindrical in shape and/or shaped to fit tightly around the outside of the chamber (e.g., mixing chamber) walls. In some embodiments, devices comprise a cooler in proximity to a chamber (e.g., sample mixing chamber), wherein the cooler is configured to cool the contents of the chamber. In some embodiments, cooling the contents of the mixing chamber facilitates binding of analyte to PMPs. In some embodiments, devices comprise a heater located on the distal side of the transfer surface (e.g., near or adjacent to an elution chamber), wherein the heater is configured to heat liquid pooled on the transfer surface. In some embodiments, heating the liquid pooled on the transfer surface facilitates release of the analyte from the PMPs.

In some embodiments, provided herein are systems comprising the devices described herein with one or more reagents. In some embodiments, reagents are liquid reagents. In some embodiments, reagents are dry, solid, or lyophilized reagents. Reagents may be contained within a chamber. In some embodiments, reagents are sequestered from the chamber (e.g., within a capsule or behind a film within the capsule). In some embodiments, a reagent is release upon breaking or dissolving a material (e.g., capsule, shield, film, etc.) that sequesters the reagent from the rest of the chamber. In some embodiments, a reagent is coated or attached to a surface (e.g., side or bottom) of the chamber or a lid of a chamber.

In some embodiments, provided herein are systems comprising a device described herein and buffer solutions within each of the multiple chambers. In some embodiments, the buffer solutions comprise an analyte binding buffer, one or more wash buffers, and an elution buffer. In some embodiments, systems comprise a cover over the top opening of each chamber that prevents the buffer solutions contained in the chambers from spilling during shipping, storage, and/or handling. In some embodiments, a single cover extends across the top surface of the atolls. In some embodiments, the cover is a peelable foil laminate.

In some embodiments, systems further comprise paramagnetic particles (PMPs) displaying a capture agent for a target analyte. In some embodiments, the PMPs are contained in one of the chambers along with an analyte binding buffer that facilitate binding of the capture agent to the target analyte.

In some embodiments, systems further comprise a sample that contains a target analyte.

In some embodiments, systems further comprise a device for mixing components contained within the chambers.

In some embodiments, provided herein are methods comprising: (a) combining (i) the sample, (ii) paramagnetic particles (PMPs) displaying capture agents with affinity for the analyte, and (iii) analyte binding buffer in a first chamber of a device described herein, wherein a second buffer is contained in a second chamber adjacent to the first chamber; (b) mixing the sample, PMPs, and analyte binding buffer in the first chamber, thereby allowing binding of the capture agents to the analyte; (c) inverting the device, thereby creating pinned pools of the analyte binding buffer and the second buffer above the first chamber and second chamber, respectively; (d) applying a magnetic field above the first chamber, thereby collecting the PMPs against the proximal side of the transfer surface above the first chamber; (e) moving the magnetic field laterally along the transfer surface, thereby moving the PMPs along the proximal side of the transfer surface, through an air gap, and positioning the PMPs above the second chamber; and (f) releasing the PMPs into the second buffer contained in the adjacent chamber. In some embodiments, the second buffer is a wash buffer. In some embodiments, the magnetic field above the first chamber is applied by a magnet positioned adjacent to the distal side of the transfer surface. In some embodiments, the PMPs are released into the second buffer contained in the adjacent chamber by raising the magnet, applying a second magnetic field beneath the adjacent chamber, or both.

In some embodiments, the device comprises a third chamber, adjacent to the second chamber, and comprising a third buffer. In some embodiments, the method comprises: (g) mixing the PMPs and second buffer in the second chamber, thereby washing contaminants off the analyte and/or PMPs; (h) applying a magnetic field above the second chamber, thereby collecting the PMPs against the proximal side of the transfer surface above the second chamber; (i) moving the magnetic field laterally along the transfer surface, thereby moving the PMPs along the proximal side of the transfer surface, through an air gap, and positioning the PMPs above the third chamber; and (j) releasing the PMPs into the third buffer contained in the third chamber. In some embodiments, the third buffer is a wash buffer or an elution buffer.

In some embodiments, the device comprises a fourth chamber, adjacent to the third chamber, and containing a fourth buffer. In some embodiments, methods comprise: (k) mixing the PMPs and third buffer in the third chamber, thereby washing contaminants off the analyte and/or PMPs; (l) applying a magnetic field above the third chamber, thereby collecting the PMPs against the proximal side of the transfer surface above the third chamber; (m) moving the magnetic field laterally along the transfer surface, thereby moving the PMPs along the proximal side of the transfer surface, through an air gap, and positioning the PMPs above the fourth chamber; and (n) releasing the PMPs into the fourth buffer contained in the fourth chamber. In some embodiments, the fourth buffer is an elution buffer.

In some embodiments, provided herein is the use of a device or a system described herein for the extraction, isolation, and/or purification of an analyte from a sample.

In some embodiments, provided herein are kits comprising a device described herein, one or more buffers, and/or paramagnetic particles displaying a capture agent for an analyte.

BRIEF DESCRIPTION OF THE DRAWINGS

The Patent or Application File Contains at Least One Drawing Executed in Color. Copies of this Patent or Patent Application Publication with Color Drawings Will be Provided by the Office Upon Request and Payment of the Necessary Fee.

FIG. 14A. The cartridge contains prepackaged buffers (chambers 2-3) and dried lysing and binding reagents (chamber 1). The binding reagent is securely packaged separate from the rest of chamber 1. A peelable foil laminate seals the chambers. Sample cap and elution cap seal the bottoms of chambers 1 and 4.

FIG. 14B. A user opens the sample cap and dispenses a sample into chamber 1. The sample liquid rehydrates the dried lysing reagent.

FIG. 14C. The peelable foil laminate is removed to open all chambers. The contents of chamber 1 are mixed while chamber 1 is heated to 95° C. to denature the sample. Upon inversion of the cartridge, liquid pools are created in the air gap (G().

FIG. 14D. Chamber 1 is cooled to 60° C. using a fan (or thermoelectric cooler or other cooling component). During the cool-down (or before or after), the binding reagent tablet is released into chamber 1 and mixed with the contents of chamber 1 (the binding reagent tablet may be released independent of the cartridge orientation).

FIG. 14E. Alternative techniques for transferring PMPs from chamber 1 into chamber 2, and for washing the suspended paramagnetic particles (PMPs) in chamber 2 (also applicable to transfer to and washing in chambers 3-4). (Top) The PMPs are collected into a tight pellet on the hydrophobic transfer surface, using magnet 1. The pellet is transferred into chamber 2 through the air gap. Magnet 1 is moved away from the cartridge, and magnet 2 is positioned to stream the PMPs from the transfer surface into chamber 2. This process may be repeated a few times for efficient washing before. (Bottom) Alternately, once the PMPs are collected using magnet 1 and transferred to the transfer surface below chamber 2, the PMPs are streaked across the transfer surface, by repetitive motion of the magnet, to wash them.

FIG. 14F. Alternative techniques for eluting the isolated analyte off the PMPs. (Top) PMPs are streaked across the transfer film while simultaneously heating the atoll pool to facilitate elution of the DNA off the PMPs. (Bottom) Using an asymmetric atoll, having an extended elution segment, the PMPs are transferred into the pool above the extended atoll, and heat is applied to elute the DNA off the PMPs.

FIG. 14G. Temperature of the atoll pool is reduced and a magnet is used to collect the PMPs from and transfer them to away from the elution chamber.

FIG. 14H. Extraction of the eluate by sliding a wicking pad (mounted on a wicking pad holder) into the side of the cartridge to wick the eluate off the atoll.

DEFINITIONS

Figure 1:
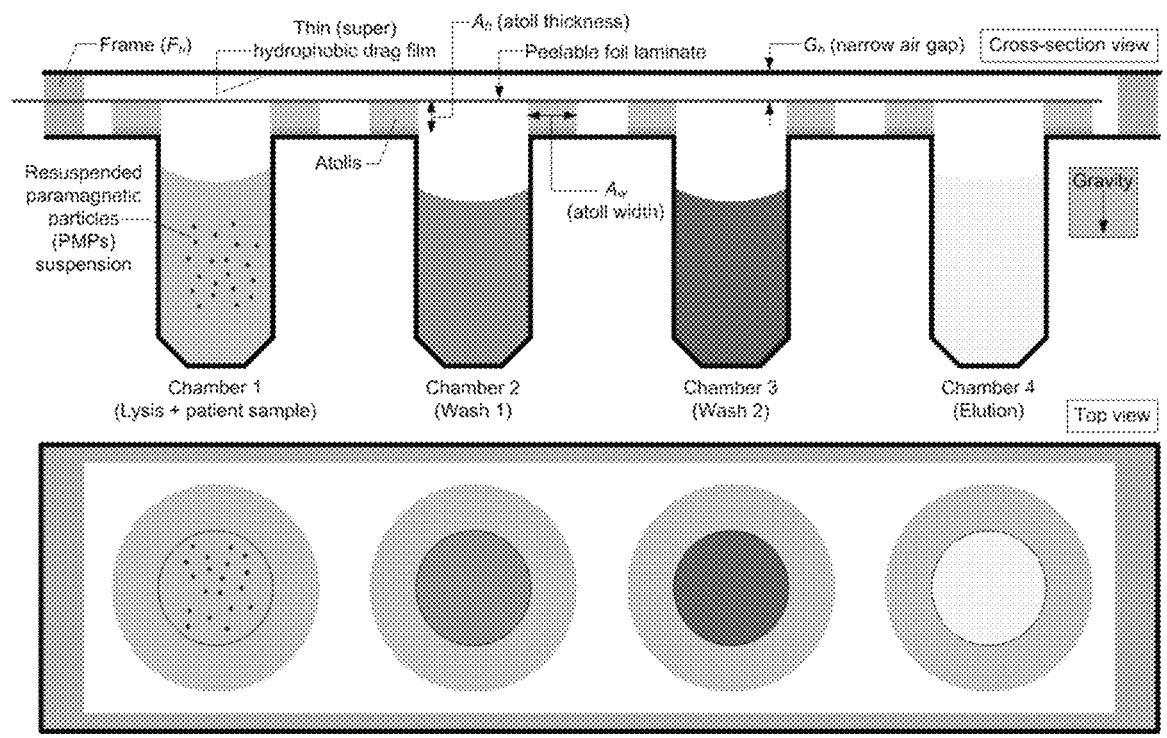
FIG. 1. Cross-section and top view schematic of an exemplary trans-interface magnetic separation (TIMS) cartridge for analyte purification and extraction. The chambers contain with appropriate buffers. Chamber 1 contains a resuspended paramagnetic particles (PMPs) suspension. The peelable foil laminate is removed prior to use.

Although any methods and materials similar or equivalent to those described herein can be used in the practice or testing of embodiments described herein, some preferred methods, compositions, devices, and materials are described herein. However, before the present materials and methods are described, it is to be understood that this invention is not limited to the particular molecules, compositions, methodologies or protocols herein described, as these may vary in accordance with routine experimentation and optimization. It is also to be understood that the terminology used in the description is for the purpose of describing the particular versions or embodiments only, and is not intended to limit the scope of the embodiments described herein.

Unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

As used herein and in the appended claims, the singular forms "a", "an" and "the" include plural reference unless the context clearly dictates otherwise. Thus, for example, reference to "a magnetic particle" is a reference to one or more magnetic particles and equivalents thereof known to those skilled in the art, and so forth.

As used herein, the term "and/or" includes any and all combinations of listed items, including any of the listed items individually. For example, "A, B, and/or C" encompasses A, B, C, AB, AC, BC, and ABC, each of which is to be considered separately described by the statement "A, B, and/or C."

As used herein, the term "comprise" and linguistic variations thereof denote the presence of recited feature(s), element(s), method step(s), etc. without the exclusion of the presence of additional feature(s), element(s), method step(s), etc. Conversely, the term "consisting of" and linguistic variations thereof, denotes the presence of recited feature(s), element(s), method step(s), etc. and excludes any unrecited feature(s), element(s), method step(s), etc., except for ordinarily-associated impurities. The phrase "consisting essentially of" denotes the recited feature(s), element(s), method step(s), etc. and any additional feature(s), element(s), method step(s), etc. that do not materially affect the basic nature of the composition, system, or method. Many embodiments herein are described using open "comprising" language. Such embodiments encompass multiple closed "consisting of" and/or "consisting essentially of" embodiments, which may alternatively be claimed or described using such language.

As used herein, the term "substantially all," "substantially complete" and similar terms refer to greater than 99%; and the terms "substantially none," "substantially free of," and similar terms refer to less than 1%.

The term "about" allows for a degree of variability in a value or range. As used herein, the term "about: refers to values within 10% of the recited value or range (e.g., about 50 is the equivalent of 45-55).

As used herein, the term "system" refers a group of devices, compositions, etc. that are collectively grouped for a desired objective.

As used herein, the term "atoll" refers to a raised ridge that surrounds and/or approximates the rim of an opening. Although an atoll can be of any suitable shape, they are typically ring-shaped, to approximate the rim of a circular opening of a well or chamber.

As used herein, the term "buffer" refers to a liquid or solution for use in the devices and methods described herein and containing the appropriate components and characteristics for achieving a desired purpose (e.g., cell lysis, binding of capture agent to analyte, washing contaminants from analyte-bound PMPs, eluting analyte from PMPs, etc.). A "buffer, as used herein, may or may not comprise compounds that provide pH stabilization.

As used herein, the term "antibody" refers to a whole antibody molecule or a fragment thereof (e.g., fragments such as Fab, Fab', and F(ab')2), it may be a polyclonal or monoclonal antibody, a chimeric antibody, a humanized antibody, a human antibody, etc.

As used herein, the term "antibody fragment" refers to a portion of a full-length antibody, including at least a portion antigen binding region or a variable region. Antibody fragments include, but are not limited to, Fab, Fab', F(ab')2, Fv, scFv, Fd, diabodies, and other antibody fragments that retain at least a portion of the variable region of an intact antibody. See, e.g., Hudson et al. (2003) Nat. Med. 9:129-134; herein incorporated by reference in its entirety. In certain embodiments, antibody fragments are produced by enzymatic or chemical cleavage of intact antibodies (e.g., papain digestion and pepsin digestion of antibody) produced by recombinant DNA techniques, or chemical polypeptide synthesis.

DETAILED DESCRIPTION

Provided herein are devices that facilitate the magnetic separation of an analyte from a sample, and methods of use thereof. In particular embodiments, devices and methods are provided for the trans-interfacial magnetic separation (TIMS) of analytes from a sample.

In some embodiments, a TIMS device (e.g., cartridge) comprises multiple (e.g., 2, 3, 4, 5, 6, 7, 8, 9, 10, or more, or ranges therebetween (e.g., 2 or more)) discrete chambers, that are each capable of containing reagent liquids.

In some embodiments, upon inversion of the device, liquid in the chambers is pinned between the chamber openings and a transfer surface (e.g., hydrophobic transfer film), which is positioned above, but not in contact with, the chamber openings.

In some embodiments, paramagnetic particles (PMPs) and any analytes bound thereto are collected from one of the chambers by placement of a magnet on the upper side of the transfer surface, thereby pinning the PMPs against the transfer surface. In some embodiments, lateral movement of the magnet along the transfer surface results in movement of the PMPs. Releasing the PMPs from the magnet (by withdrawing the magnet or streaking across the transfer surface) deposits the PMPs, and any analytes bound thereto, into a second chamber. In other embodiments, a magnet is placed just beyond the liquid/air interface, thereby drawing the PMPs from the liquid, across the liquid/air interface. The PMPs can then be transferred into the next chamber for additional processing.

In some embodiments, both PMPs and the liquid sample and reagents are transferred from one chamber to the next. In some embodiments, a channel connecting the two chambers facilitates the transfer. In some embodiments, the geometry of the chambers and the channel is such that when the device is held in a first orientation, the PMPs and liquid sample/reagents are held in an initial chamber (e.g., lysis chamber); hydrostatic pressure gravity, and/or misalignment of the liquid with the channel prevent the liquid from transferring. In some embodiments, upon placing the device into a second orientation (e.g., a 10-90° rotation), the liquid sample/reagents and the PMPs are able to flow through the channel into a subsequent chamber (e.g., a mixing chamber).

Additional features, such as atolls at the opening of the chambers, optimized chamber/atoll dimensions, magnet positions, the presence or heaters/coolers, sealed reagents, sealed chambers vs. openable chambers, airlocks, pinning ledges, hydrophilic and hydrophobic coatings, hydrostatic pressure, cartridge rotation, rotational mixing, independent lysing and mixing chambers, etc. facilitate sample processing and the efficient movement of analyte-bound particles between the chambers, with minimized transfer of the chamber liquids or other contaminants across liquid/air interfaces (e.g., less than 10% of transferred material (e.g., by mass, by volume, etc.) is chamber liquid (e.g., <10%, <9%, 8%, 7%, 6%, 5%, 4%, 3%, 2%, 1%, 0.5%, 0.2%, 0.1%, or less), and purification/isolation of analytes from a sample with the devices herein. Exemplary embodiments are depicted in the Figures and described herein.

In some embodiments, a TIMS cartridge comprises multiple (e.g., 2, 3, 4, 5, 6, 7, 8, 9, 10, or more, or ranges therebetween (e.g., 2 or more)) discrete chambers (e.g., identical chambers or specifically oriented, capped, arranged, sized, shaped etc. for specific uses (e.g., reagent addition/mixing, lysis, washing, elution, etc.).

In some embodiments, sample preparation buffers are added by a user or pre-loaded for a specific application (e.g., for purification/extraction/isolation/preparation of a particular analyte). In some embodiments, reagents (e.g., lysing reagents, binding reagents, elution reagents, washing reagents, etc.) are added or preloaded in the chambers. PMPs displaying capture reagents (e.g., nucleic acid hybridization probes, antibodies or antibody fragments, affinity agents (e.g., streptavidin, divalent nickel, etc.), etc.) for a desired analyte (e.g., DNA or RNA, agent displaying an epitope, affinity target (e.g., linked to biotin, displaying a $His_6$ tag, etc.) etc.) are added by a user or pre-loaded into a chamber. In some embodiments, reagents and buffers may be accessible within the chamber or may be reversibly-sealed from main chamber (e.g., by a capsule, film, blister, or other covering). In some embodiments, reagents and buffers are added via a channel connected to a chamber. In some embodiments, reagent flow from one chamber to the next via a channel (e.g., upon device rotation or plunger action to allow the reagents to access or travel through the channel). In some embodiments, a vent allows for release of pressure upon addition of a reagent via a channel.

Devices herein comprise multiple chambers and device geometries configured for the transfer of (i) PMPs and fluids (e.g., sample, buffer(s), reagents, etc.), or (ii) PMPs alone between chambers. Some embodiments herein make use of an air gap (e.g., comprising one or more liquid/air interfaces) between two chambers to facilitate the transfer of PMPs/binding agents and analytes bound thereto from an initial chamber to a subsequent chamber while minimizing transfer of liquid (e.g., sample, reagents, contaminants, buffer, etc.). Various device geometries and transfer methods may be used to establish the air gap and liquid/air interface(s), such as, inversion of the device (e.g., particularly when coupled with atoll-topped chambers), an airlock chamber (e.g., with pinning ledges) beneath a transfer channel and transfer (e.g., drag) surface, etc. Exemplary geometries/methods for creating an airgap and passing PMPs and bound analytes through the air gap are described herein. Other embodiments herein allow for the transfer of both PMPs and fluid (e.g., sample, buffer(s), reagents, etc.) between chambers; such embodiments may comprise channels between chambers that prevents transfer of materials (e.g., PMPs and fluids) when the device is positioned in a first orientation, but allows for transfer of materials (e.g., PMPs and fluids) when the device is positioned in a second orientation (e.g., rotated 10-90°) about an axis of the device. Exemplary geometries/methods for passing PMI's, liquid reagents (e.g., sample, buffer(s), reagents, etc.) and bound analytes between chambers are described herein. Certain devices herein may combine various elements for transferring materials between chambers, and/or may combine various techniques for transfer of material between chambers.

Figure 2:
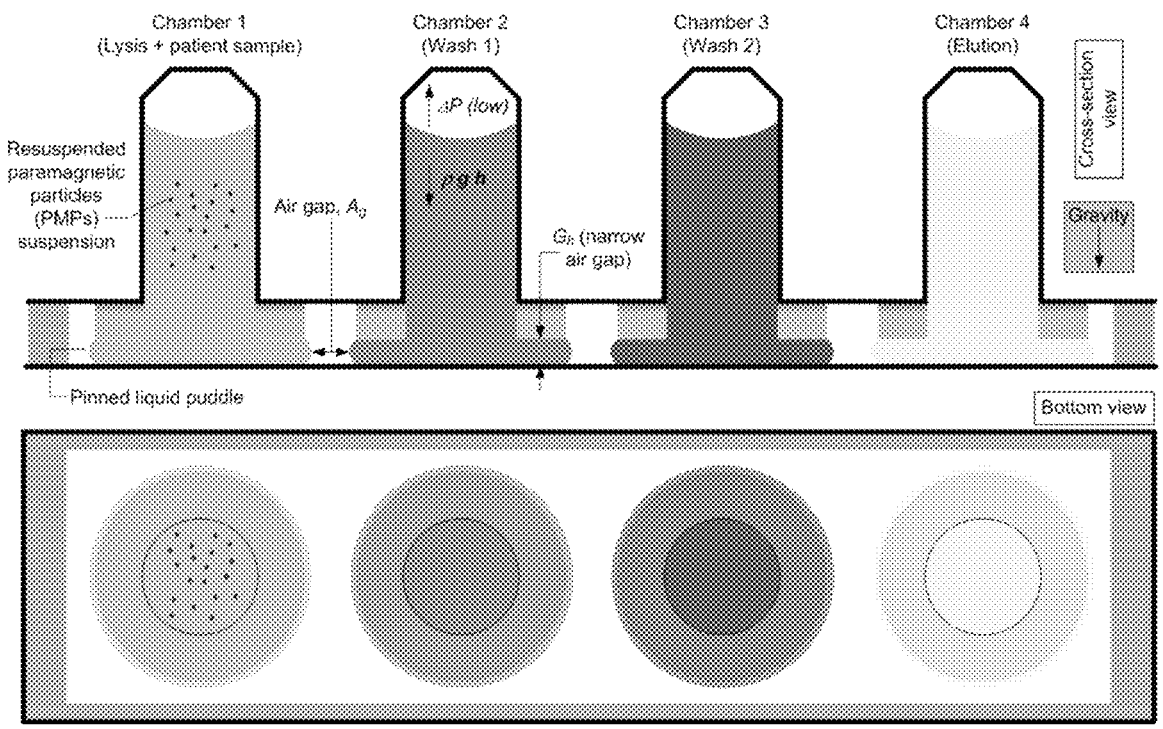
FIG. 2. Cross-section and top view schematic of an exemplary TIMS cartridge in an inverted positon. With the TIMS cartridge inverted, the low pressure in the air cavity above balances the hydrostatic pressure. The outer diameter (OD) edge of the atolls and hydrophobic surface generate a pinned liquid pool for each chamber, with an air gap ($A_g$) between the liquid from each chamber.
Figure 3:
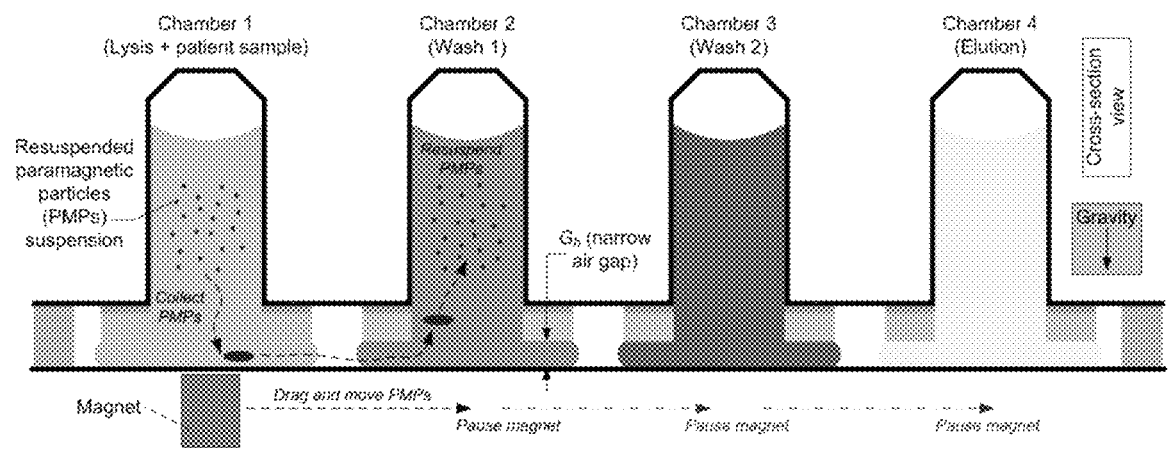
FIG. 3. A magnet on the distal side of the thin hydrophobic transfer film collects the PMPs into a tight pellet and moves this pellet through the liquid-to-air-to-liquid interfaces to be position above the next chamber, where the PMPs are then released into the chamber, and the process is repeated for subsequent chambers.
Figure 14A:
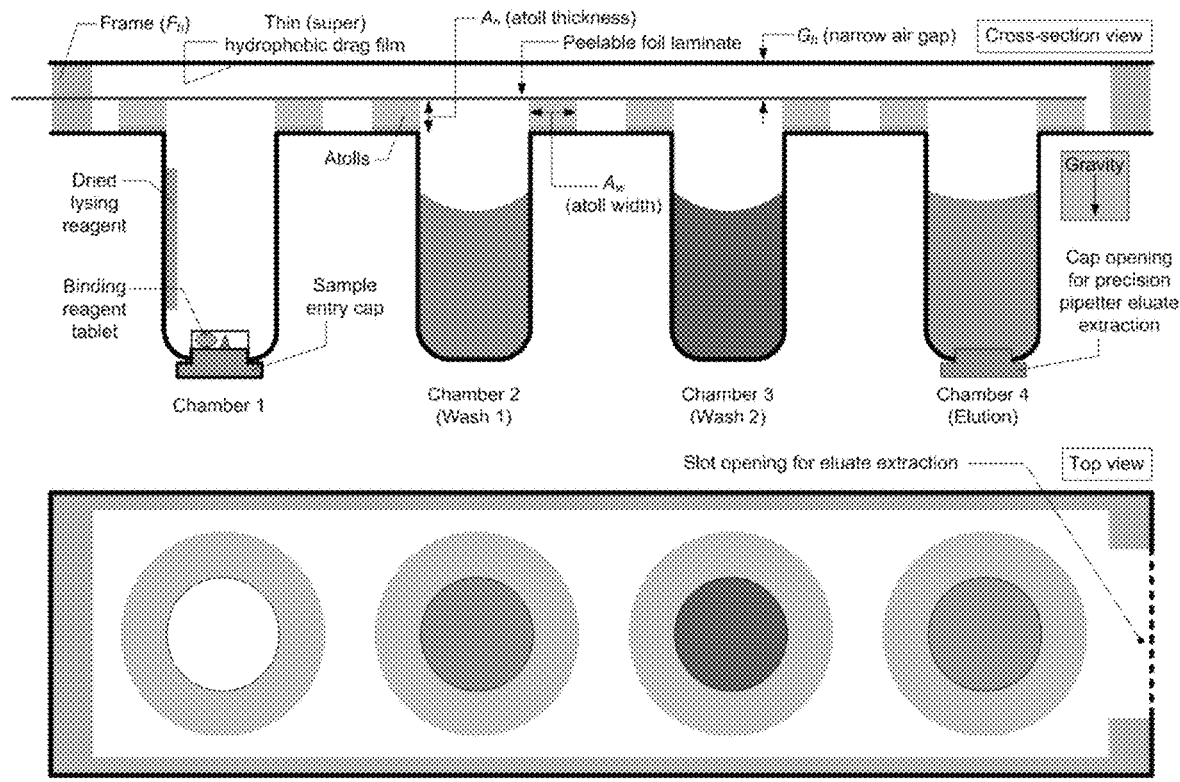
FIG. 14A-H. Cross-section and top views of an exemplary trans-interface magnetic separation (TIMS) cartridge, depicting steps of exemplary method of analyte purification and extraction.
Figure 14B:
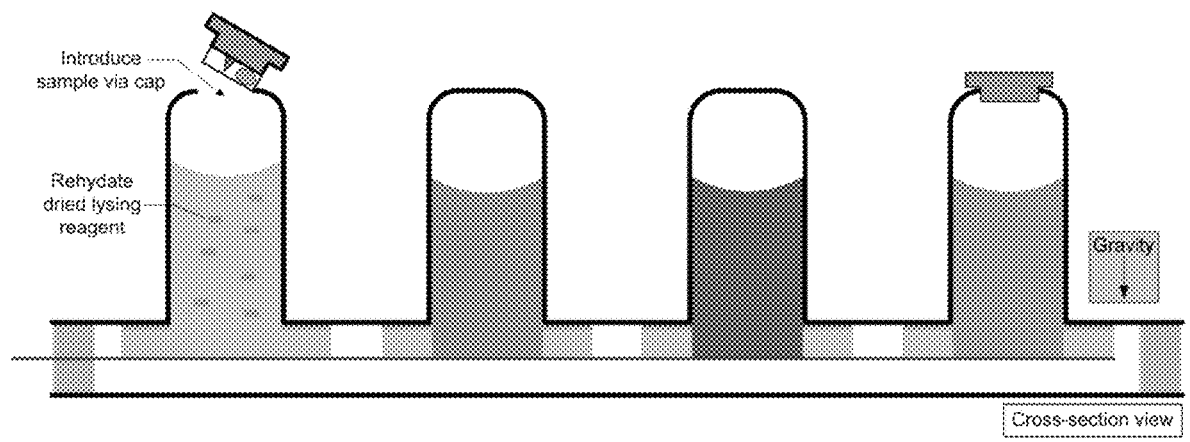
Figure 14C:
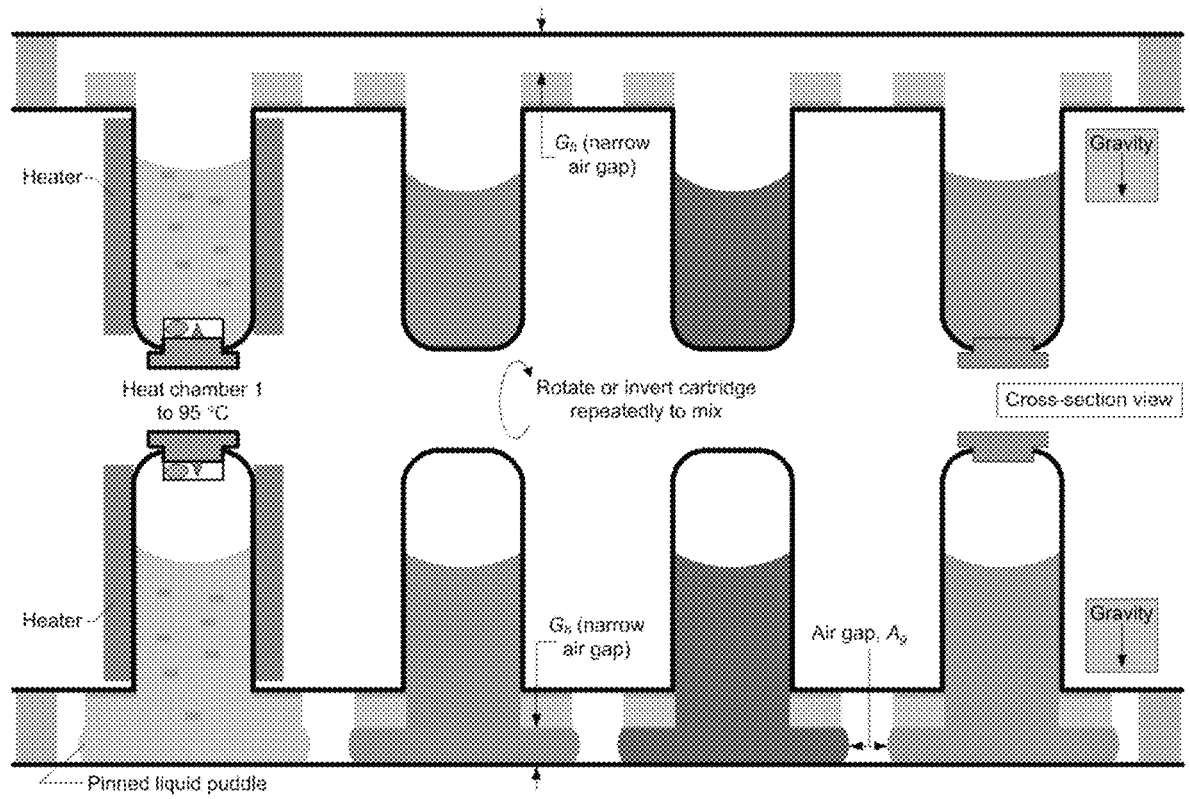
Figure 14D:
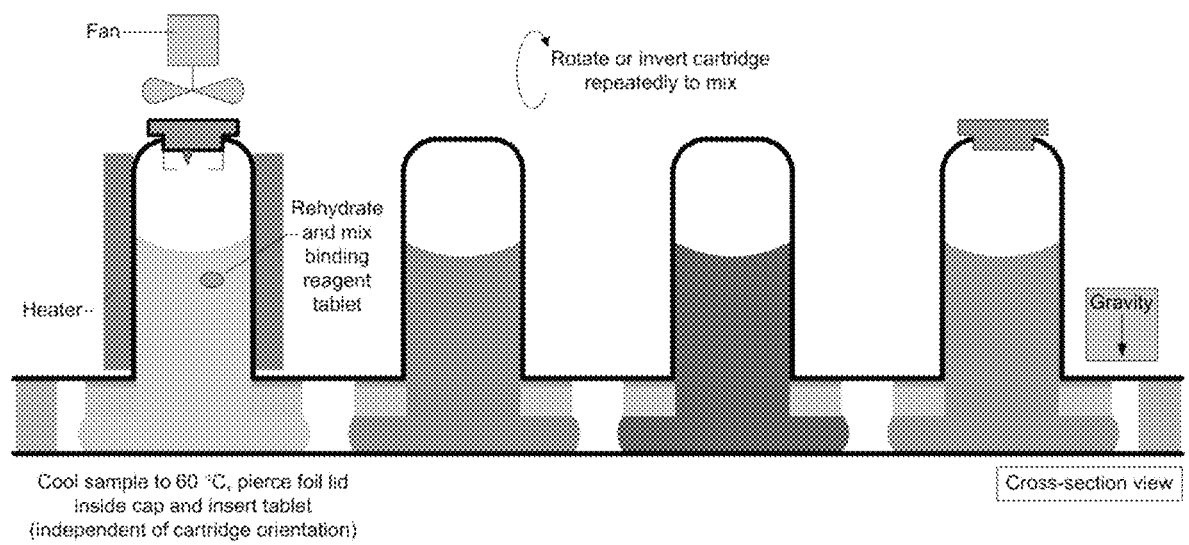
Figure 14E:
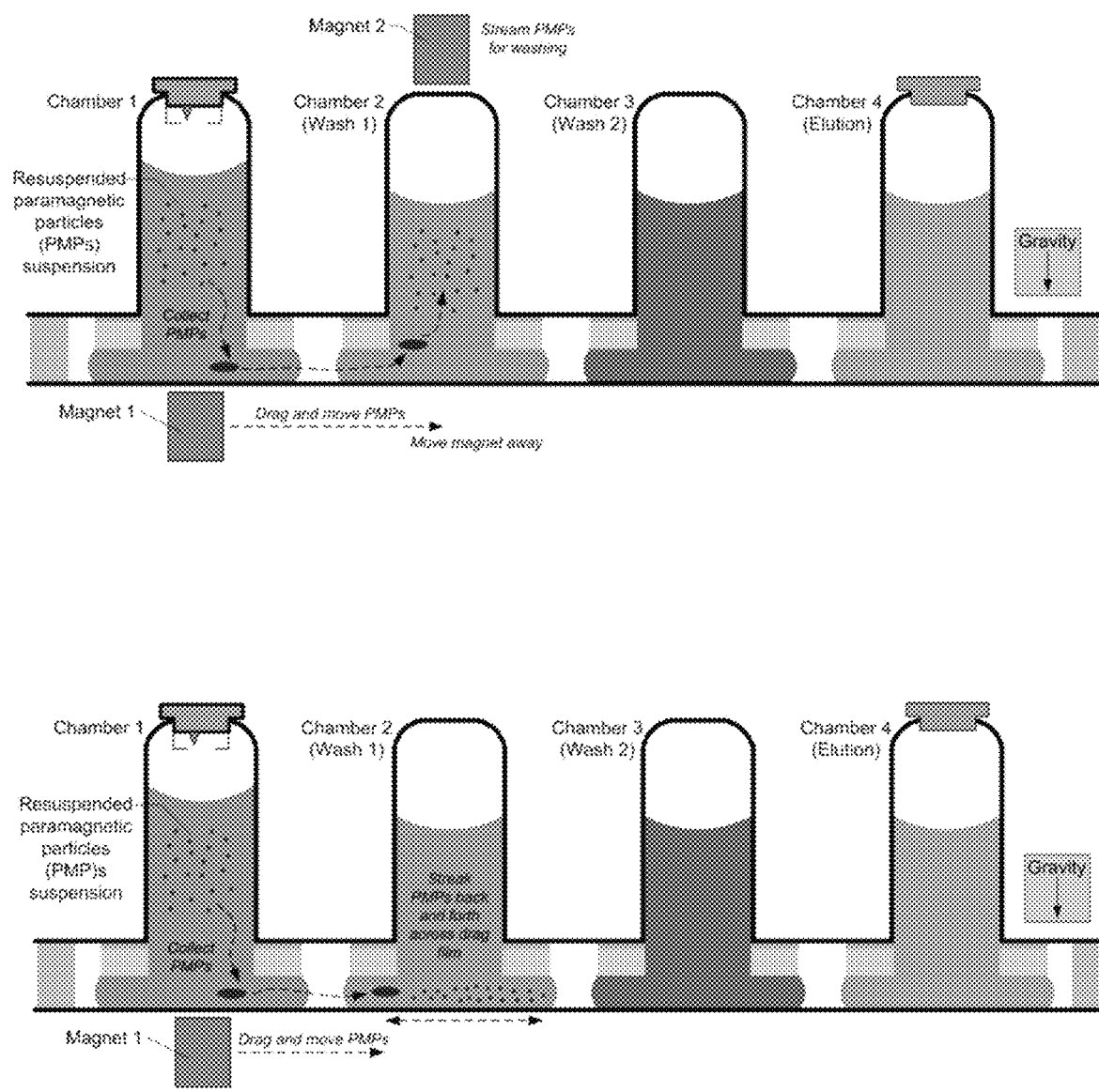
Figure 14F:
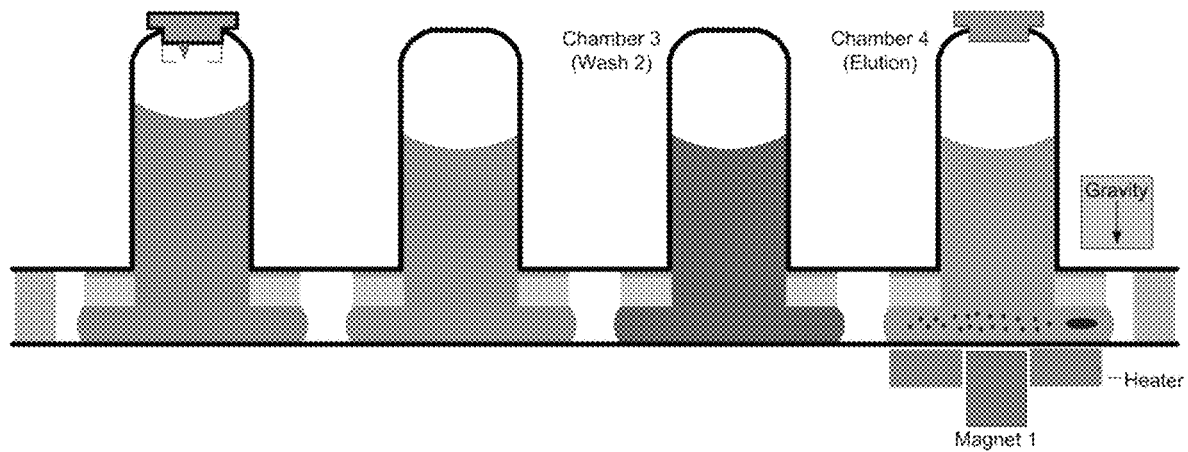
Figure 14F:
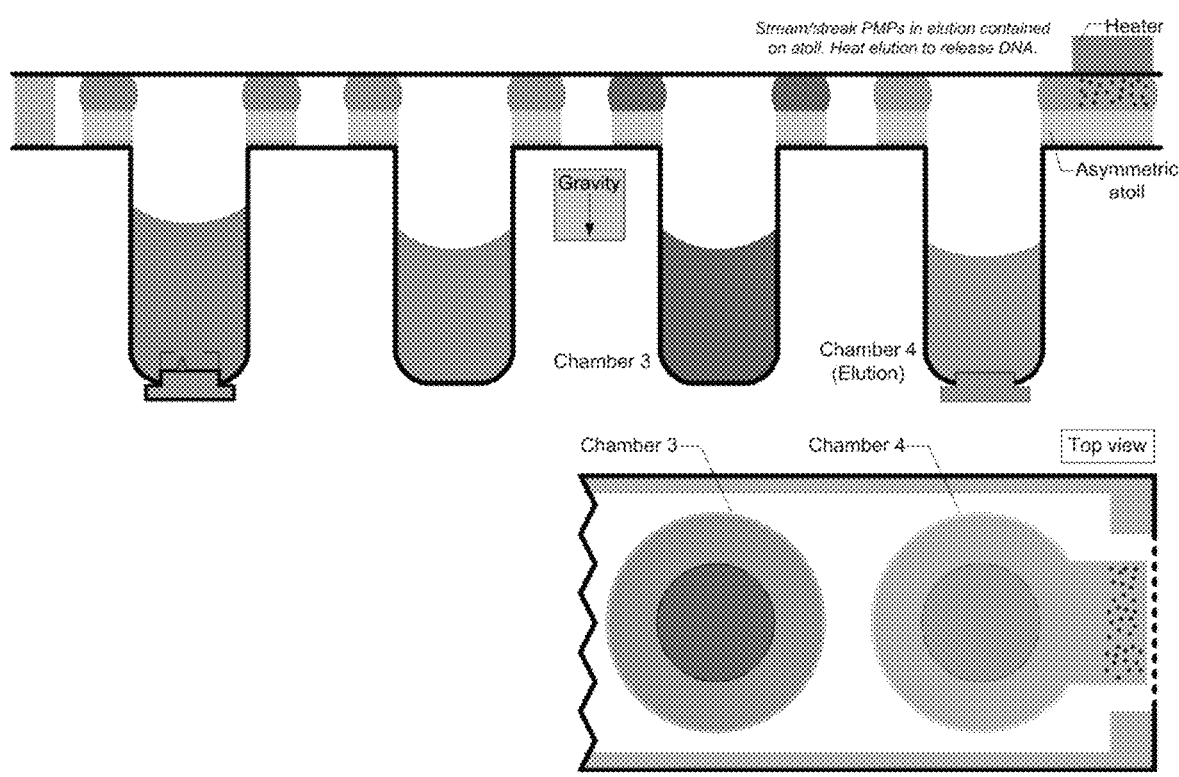
Figure 14G:
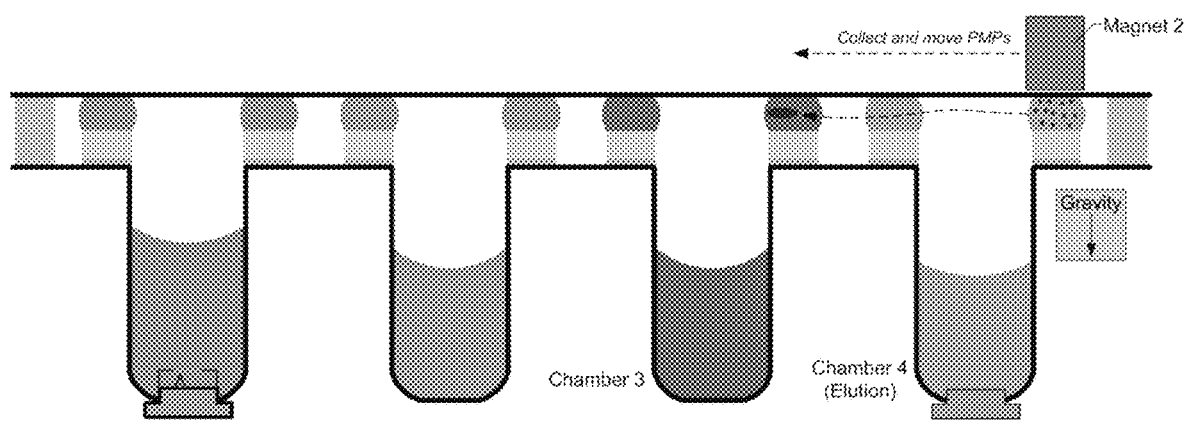
Figure 14H:
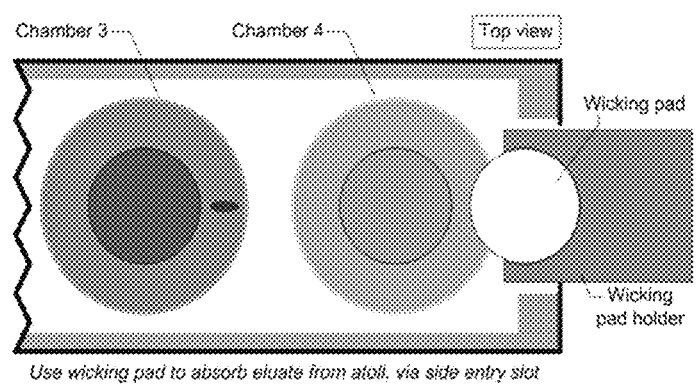

In some embodiments, a user dispenses a sample (e.g., a biological or environmental sample) containing or suspected of containing the particular analyte in the first chamber. In some embodiments, the PMPs, sample, buffer, reagents, etc. of the first chamber are mixed (e.g., manually (e.g., shaking, inversion, etc.) or by mechanical means (e.g., sonication, magnetic streaming, etc.) to resuspend the PMPs and/or to allows binding of analyte to the capture reagent on the PMPs. In some embodiments, the temperature of the chamber is manipulated (e.g., heated, cooled, or both) to facilitate sample mixing, sample lysing, analyte binding, etc. The cartridge is manipulated (e.g., inverted) such that the liquid in the chambers is pinned in the air gap between the rim of the chambers (and/or the top of the atolls) and the transfer film (e.g., hydrophobic transfer film) (FIG. 2). Appropriate dimensions of the cartridge (e.g., $G_h$) ensure that an air gap ($A_g$) exists between the pinned liquid pools produced by the liquid in each chamber. The PMPs (e.g., having captured analyte present in the first chamber) are collected by application of a magnetic field to the first chamber, through the transfer surface (FIG. 3). In some embodiments, a magnet is placed (e.g., manually by a user, by an automated device, etc.) on the distal side of the transfer surface to form a pellet of analyte-bound PMPs against the transfer surface. Movement of the magnetic field, laterally across the transfer surface, moves the collected PMPs through the pinned liquid of the first chamber, into the air gap between the first and second chambers, and into the pinned liquid of the second chamber. Removing the magnetic field releases the analyte-bound PMPs into the buffer of the second chamber. Alternatively, traversing the magnet (e.g., repeatedly) across the transfer surface may be used to release the analyte-bound PMPs by streaking onto the transfer surface. In some embodiments, release of the PMPs into the chamber is facilitated by temporary application of a magnetic field to the opposite end (e.g., the bottom, the closed end, etc.) of the chamber. The process of mixing in the buffer (e.g., to wash the PMPs and analyte), magnetically collecting the PMPs, moving the PMPs through an air gap into the pinned liquid of the next chamber (e.g., wash buffers), and releasing the PMPs into the next chamber is repeated for subsequence chambers. In some embodiments, the PMPs are moved into an elution buffer in the final chamber to release the analyte from the PMPs. In some embodiments, analyte release is facilitated by heating the sample in the elution buffer. The PMPs are removed from the elution buffer, resulting in extracted/isolated/purified analyte in solution. PMPs may be removed from the elution buffer by any suitable technique (See, e.g., FIG. 14F-G). In some embodiments, once the PMPs are separated from the analyte and/or the elution buffer, the analyte and/or elution buffers is removed from the device (e.g., FIG. 14H). In some embodiments, the above process provides for purification of a desired analyte, in/on a single device within minutes (e.g., 20 minutes, 15 minutes, 10 minutes, 5 minutes, 4 minutes, 3 minutes, 2 minutes, or less, or ranges therebetween (e.g., <10 minutes)). In some embodiments, the extracted/isolated/purified analyte is ready for analysis and/or subsequent processing.

In some embodiments, one or more of a sample (e.g., processed (e.g., lysed, filtered, centrifuged, etc.) or unprocessed), PMPs, lysing reagent, buffer, and other reagents are combined within the first chamber (e.g., the mixing chamber). In some embodiments, the analyte (e.g., in the sample (e.g., processed or unprocessed)) and the PMPs are added separately to the first chamber (e.g., mixing chamber). In some embodiments, the analyte (e.g., in the sample (e.g., processed or unprocessed)) and the PMPs are combined within the first chamber (e.g., mixing chamber).

While embodiments of the devices herein are not limited by size, shape, or relative dimensions, in some embodiments, the preferred dimensions (e.g., $A_w$, $A_h$, $G_h$, $F_h$, $A_g$, etc.) described herein provide for efficient and useful analyte purification.

In some embodiments, the openings of the chambers are topped by atolls. In some embodiments, the atolls rise above the opening of the chamber. In some embodiments, the atolls of adjacent chambers do not connect, creating a gap between adjacent atolls. In some embodiments, atolls created a discontinuity of the surface between the chamber openings. In some embodiments, the atolls approximate the opening of the chamber and are of a similar shape to the chamber opening (e.g., circular). In other embodiments, atolls and chamber openings are of different shapes. For example, in certain embodiments, an asymmetric atoll allows for additional space to collect a sample against the transfer surface (e.g., for elution (FIG. 14H)). In some embodiments, the atolls are of a defined height ($A_h$) and width ($A_w$). The atoll height ($A_h$), along with the distance between the transfer surface and the top of the chambers ($F_h$), defines the height of the air gap ($G_h$) (FIG. 1). The atoll width ($A_w$), along with the distance between the adjacent chambers defines the width of the air gap ($A_g$) (FIG. 2). The height of the air gap ($G_h$) defines and creates a stable liquid pool around the outer edge of the atoll. Appropriate dimensions are selected to create an air gap of sufficient dimensions to allow transference of the PMPs from the pinned liquid of a first chamber to the pinned liquid of an adjacent chamber, without contact between the pinned liquids (e.g., while maintaining the air gap) and without significant contamination of the liquid of the adjacent chamber with the liquid from the first chamber. Exemplary gaps heights ($G_h$) on the order of about 0.025 to 0.25 mm (e.g., 0.025 mm, 0.03 mm, 0.04 mm, 0.05 mm, 0.06 mm, 0.07 mm, 0.08 mm, 0.09 mm, 0.10 mm, 0.11 mm, 0.12 mm, 0.13 mm, 0.14 mm, 0.15 mm, 0.16 mm, 0.17 mm, 0.18 mm, 0.19 mm, 0.20 mm, 0.21 mm, 0.22 mm, 0.23 mm, 0.24 mm, 0.25 mm or ranges therebetween (e.g., 0.10 to 0.15 mm)) between the atolls and the transfer surface ensures that when the cartridge is inverted (FIG. 2), liquid within each chamber will flow out, and become pinned at the outer diameter (OD) of each respective atoll. Since $G_h$ is small, surface tension and capillary forces dominate (Bond number, Bo<<1, see Equation 1), as seen in Figure, and gravity will not cause the liquids to lose their pinned edges.

$$Bo = \frac{\Delta \rho g (G_h)^2}{\sigma}. \quad \text{Equation 1}$$

where:
$\Delta\rho$=difference in density of two phases
g=gravitational acceleration
$G_h$=thin gap between frame and atoll, where liquid pool is pinned
$\sigma$=surface tension The sealed liquid chambers minimize the hydrostatic head by pulling negative air pressure as liquid flows out. Further, the atolls offer a large, circular interface that spreads the hydrostatic pressure over a relatively large area (FIG. 2). Discrete liquid pools are created for each chamber, separated by an air gap ($A_g$), which prevents liquid cross-contamination. This eliminates the need for costly immiscible polymerase chain reaction (PCR) compatible oils used in many other technologies. In some embodiments, an atoll's inner diameter has rounded edges or corners to facilitate the flow of liquid and PMPs over the atoll.

In some embodiments, $A_g$ is sufficiently large to ensure no liquid bridging during TIMS (PMP pellet movement from chamber to chamber). Further, the pinned liquid edges are not disturbed. In some embodiments, $G_h$ is sufficiently large to prevent shearing of the tight PMP pellet (e.g., pellet height) during movement along the narrow channel, but small enough to leverage surface tension and liquid pinning at the atoll outer edges. High magnetic field strengths are leveraged by using a thin transfer surface. For example, a hydrophobic film reduces PMP loss during movement (PMPs will not stick to the surface). The PMPs will cross-over liquid-to-air-to-liquid interfaces. Liquid carryover (e.g., undesired contamination) from one chamber to the next is minimized.

In some embodiments, the devices herein comprise multiple chambers (e.g., 2, 3, 4, 5, 6, 7, 8, 9, 10, 11, 12, 16, 20, 24, 32, or more, or ranges therein). In some embodiments, the chamber opening sits flush with a surface of the device (e.g., with atolls rising above the surface). In some embodiments, several chambers are linearly disposed along a device. In some embodiments, chambers are disposed in multiple rows and/or columns on a surface of the device. In some embodiments, all chambers of a device are identical is size, shape, etc. In some embodiments, multiple different chambers (e.g., for different functions (e.g., sample mixing, sample lysis, PMP-binding, washing, elution, etc.) are provided on a device. In some embodiments, chambers comprise an open top and a closed bottom when the device is in operation. In some embodiments, the open tops of the chambers are sealed (prior to use) by a single removable closure (e.g., peelable film or laminate). In some embodiments, the open tops of the chambers are individually-sealed (prior to use) by individual closures (e.g., peelable film or laminate, caps, screw lids, etc.). In some embodiments, the closed bottoms are irreversibly closed (e.g., bottom is attached to the sides). In some embodiments, the bottom of the chamber comprises a re-sealable lid or cap.

In some embodiments, chamber volumes range from 25 μl to 2 ml (e.g., 25 μl, 50 μl, 100 μl, 150 μl, 200 μl, 300 μl, 400 μl, 500 μl, 600 μl, 700 μl, 800 μl, 900 μl, 1 ml, 1.5 ml, 2 ml, or ranges therebetween (e.g., 50 μl to 1 ml)). In some embodiments, chamber openings range from 1 to 15 mm in diameter (e.g., 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, or ranges therebetween (e.g., 2 to 10 mm)). In some embodiments, atoll width ($A_w$) is between 1 and 20 mm (e.g., 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, or ranges therebetween (e.g., 1 to 10 mm)). In some embodiments, atoll height ($A_h$) is between 0.1 and 5 mm (e.g., 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 2.0 mm, 2.5 mm, 3.0 mm, 3.5 mm, 4.0 mm, 4.5 mm, 5.0 mm, or ranges therebetween (e.g., 0.1 to 3 mm)). In some embodiments, frame height ($F_h$) is between $A_h$+0.025 mm and $A_h$+0.5 mm (e.g., $A_h$+0.025 mm, $A_h$+0.050 mm, $A_h$+0.1 mm, $A_h$+0.125 mm, $A_h$+0.15 mm, $A_h$+0.175 mm, $A_h$+0.2 mm, $A_h$+0.225 mm, $A_h$+0.25 mm, $A_h$+0.275 mm, $A_h$+0.3 mm, $A_h$+0.325 mm, $A_h$+0.35 mm, $A_h$+0.375 mm, $A_h$+0.4 mm, $A_h$+0.425 mm, $A_h$+0.45 mm, $A_h$+0.475 mm, $A_h$+0.5 mm, or ranges therebetween (e.g., $A_h$ 0.025 mm and $A_h$+0.25 mm)). In some embodiments, narrow gap height ($G_h$, defined as $F_h$−$A_h$) is between 0.025 mm and 0.5 mm (e.g., 0.025 mm, 0.050 mm, $A_h$+0.15 mm, 0.175 mm, 0.2 mm, 0.225 mm, 0.25 mm, 0.275 mm, 0.3 mm, 0.325 mm, 0.35 mm, 0.375 mm, 0.4 mm, 0.425 mm, 0.45 mm, 0.475 mm, 0.5 mm, or ranges therebetween (e.g., 0.025 mm and 0.25 mm)). In some embodiments, the air gap between atolls ($A_g$) is between 0.5 and 8 mm (e.g., 0.5 mm, 0.6 mm, 0.7 mm, 0.8 mm, 0.9 mm, 1.0 mm, 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, or ranges therebetween (e.g., 1 to 5 mm)).

Figure 16:
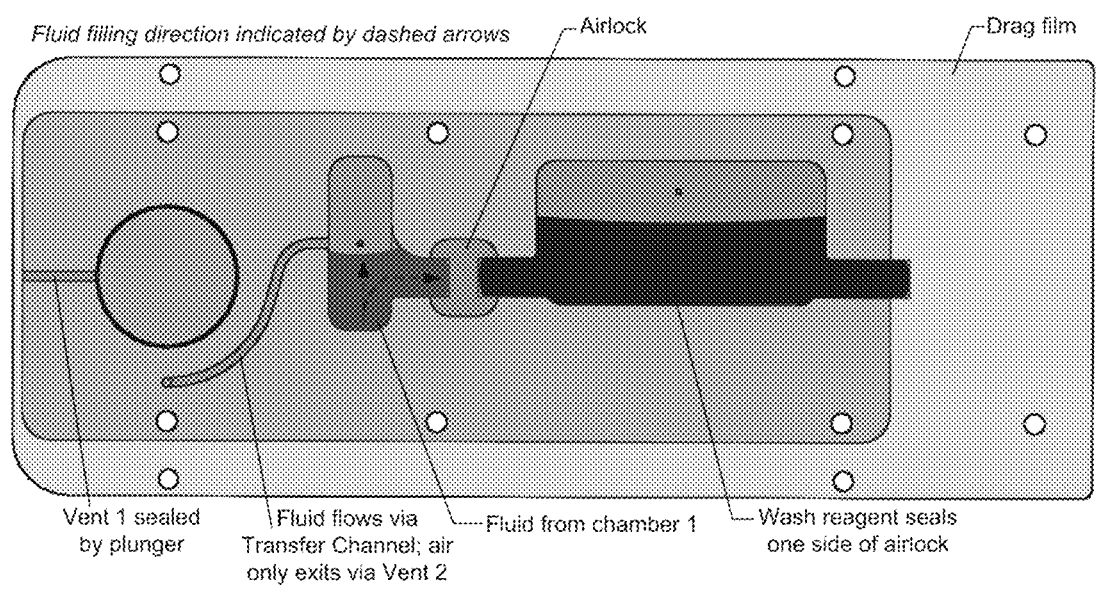
FIG. 16. Schematic of an exemplary assembled cartridge consumable depicting how the wash reagent primes the channel and pins at pinning ledge 2. The red fluid is transferred from chamber 1 to chamber 2 through the Transfer channel (which connects chambers 1 and 2) via the plunger. The airlock stabilizes and pins the fluid in chamber 2, separating the two fluids by an air gap.

In some embodiments, a chamber comprises a flat bottom and consistent depth across the entire chamber. However, in other embodiments, a chamber comprises a deep portion and a shallow portion. A chamber comprising different depths will have a different effective volume, depending upon the orientation of the device. For example, when the device in the planar orientation, liquid within such a chamber will reside in the deep portion of the chamber; however, upon rotation of the device into an off-planar orientation, the liquid will flow into the shallow portion of the chamber. In some embodiments, placing the liquid into a different depth of the chamber may result in the liquid flowing into a channel and/or become pinned against the airlock (e.g., See FIG. 16).

Figure 4:
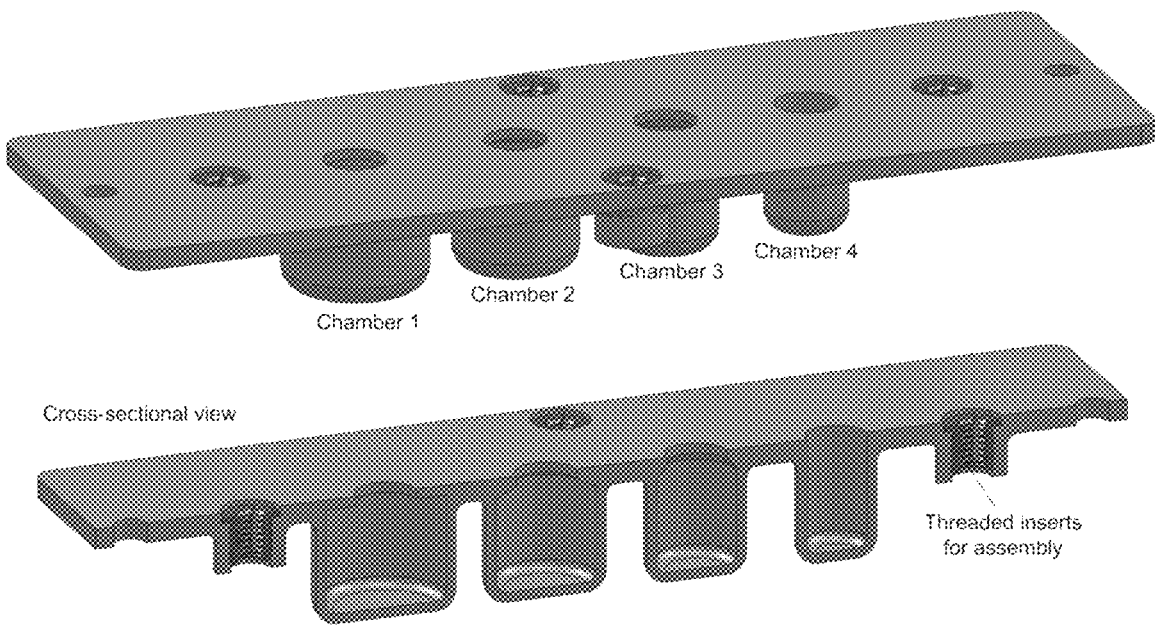
FIG. 4. Exemplary 4-chamber TIMS cartridge. Four threaded inserts and two alignment holes are present on the outer periphery for assembly.
Figure 5:
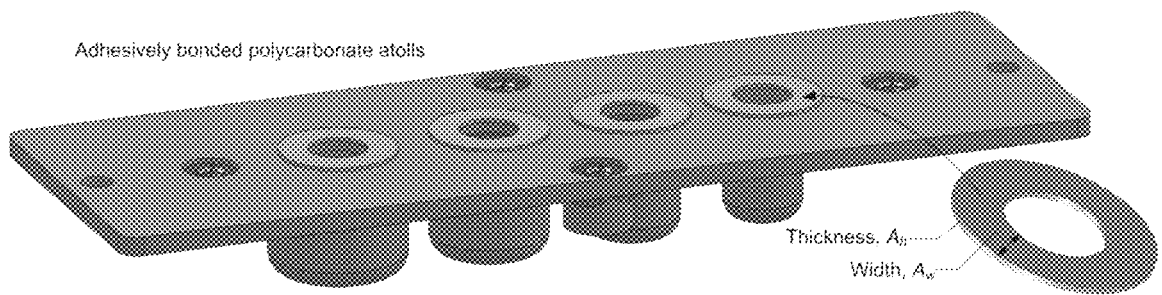
FIG. 5. Polycarbonate plastic atolls are laser cut, concentrically aligned with each of the four chambers, and adhesively bonded to the cartridge surface.
Figure 12:
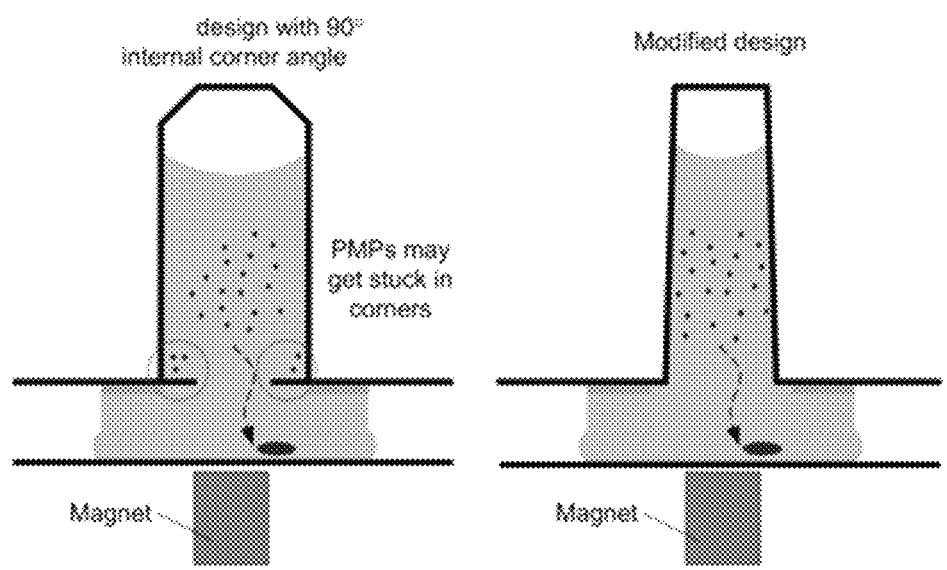
FIG. 12. (Left) Cartridge chamber design with a 90° corner angle on the inside neck, which may trap PMPs during collection. (Right) Modified design mimicking chamber 4 from FIG. 4, with drafts to make it amenable for injection molding.

In some embodiments, the devices described herein are not limited by the shape of dimensions of the chambers and chamber openings, so long as liquid from the inverted chambers is pinned against the transfer surface, and an air gap is formed between the pinned liquid of adjacent chambers. Embodiments depicted herein exhibit circular chambers and chamber openings (and therefore ring-shaped atolls). In some embodiments, a device comprises chambers with circular cross-sections and/or circular opening cross-sections. In other embodiments, chambers and/or chamber openings of other shapes (e.g., oval, triangular, square, pentagonal, hexagonal, etc.) are utilized. In some embodiments, chambers have a neck portion, such that the opening of the chamber is smaller (e.g., smaller diameter) than the chamber itself (FIG. 4). In other embodiments, the opening of the chamber is the same size (e.g., same diameter) as the chamber itself (FIG. 4). In some embodiments, the walls of the chamber are parallel to each other and/or perpendicular to the chamber opening (FIG. 12, left). In other embodiments, the chamber walls are inclined to create a chamber opening that is larger than the average width (e.g., diameter) of the chamber. In some embodiments, the chamber opening is about the same size as the magnet used to remove PMPs from the chamber (e.g., +/−20%, +/−15%, +/−10%, +/−50%, +/−2%, +/−1%, or ranges therebetween). In some embodiments, the bottom of the chambers may be of any suitable shape (e.g., rounded, squared-off, flat, etc.).

In some embodiments, the interior of a chamber is a single open space. In other embodiments, the chamber comprises one or more sealable (and unsealable) compartments. In some embodiments, a reagent is contained within a compartment and is released into the rest of the chamber under desired circumstances (e.g., dissolved by addition of liquid or a particular reagent, seal is broken, dissolved under heat, etc.).

In some embodiments, devices comprise atolls atop the chamber openings. In some embodiments, the atolls facilitate pinning of the liquid within the chamber between the atolls and the transfer surface. In some embodiments, the atoll surrounds the chamber opening. In some embodiments, the atoll approximates the top surface of the opening. In some embodiments, the atoll is of the same shape (e.g., circular) as the outer rim of the chamber opening. In some embodiments, atoll has an inner width or diameter equal to the diameter or width of the chamber opening. In some embodiments, the atoll has an outer width or diameter that is greater than the diameter or width of the chamber opening. In some embodiments, atoll shape is not limited to that of the chamber opening. An atoll may comprise wider or narrower regions to, for example, alter the volume of liquid pinned above the atoll.

When the device is inverted (or in other embodiments, rotated), gravity pulls the liquid from the chamber and a 'pool' of liquid from each chamber is pinned between the atolls and the transfer surface. The dimensions of the device ensure that the pool front advances only as far (about as far) as the outer edge (e.g., outer diameter (OD) of the atoll. The transfer surface limits the flow of the liquid from the chambers and prevents spillage or contamination between the chambers. The transfer surface also provides the platform upon which the PMPs are transferred through the air gap to the adjacent pinned liquid pool. In some embodiments, a transfer surface comprises a smooth, flat, and/or rigid material. In some embodiments, the transfer surface comprises a smooth, rigid plastic, such as polycarbonate. Other exemplary materials for the transfer surface and other device components are described herein and find use in some embodiments. In some embodiments, the transfer surface comprises or is fully or partially coated with a hydrophobic coating (e.g., superhydrophobic coating), such as a manganese oxide polystyrene ($MnO_2$/PS) nano-composite, zinc oxide polystyrene (ZnO/PS) nano-composite, precipitated calcium carbonate, carbon nanotube-based coating, silica nano-coating, etc. Any coating, film, membrane, etc. that results in a large contact angle between the liquid and the transfer surface may find use in embodiments herein. In some embodiments, a hydrophobic coating on a transfer surface (e.g., drag film) or other surface contacted by the PMPs, helps with both stabilizing pinned liquid-air interfaces, and preventing stiction of PMPs during streaming/moving, especially in the airlock region where there is no liquid for the pellet to use as lubrication.

In some embodiments, an airgap is created between chambers (e.g., along a transfer channel). In some embodiments, two chambers are separated by an airtrap (e.g., a small chamber located beneath a transfer channel between two chambers). In some embodiments, the airtrap induces an air gap (e.g., by virtue or surface tension between liquid on either side of the airtrap with the base layer and/or drag (or transfer) layer. In some embodiments, the air gap is further induced by the presence of pinning ledges (e.g., overhangs) present on the base layer that extend over the airlock, but do not cross the airlock. In some embodiments, liquid on one side of the airlock forms a liquid/air interface extending from the end of the pinning ledge to the transfer (or drag) layer. In some embodiments, application of a magnetic field from behind (or above) the transfer layer allows PMPs to be transferred across the transfer layer, through the air gap, while the liquids (e.g., sample, buffer(s), reagent, etc.) are prevented from passing by the airlock. In some embodiments, a magnetic field applied from above (or behind) the transfer layer and within the air gap, draws PMPs through the liquid/air interface without significant transfer of liquid materials (e.g., sample, buffer(s), reagent, etc.); in such embodiments, movement of the magnetic field allows transfer of the PMPs into a subsequence liquid layer.

In some embodiments, in addition to leveraging surface tension capacity, the sealed airlock chamber further helps create stable liquid-air interfaces, for example, between chamber 2 (e.g., mixing chamber) and chamber 3 (e.g., wash chamber). In some embodiments, the airlock creates an air gap between, for example, chambers 2 and 3, through which PMPs are transferred, but liquids (e.g., sample, buffer(s), reagent, etc.) and contaminants are not.

In some embodiments, an airlock chamber comprises dimensions (e.g., length (e.g., along the transfer channel), width (e.g., perpendicular to the transfer channel), and depth of 2-15 mm (e.g., 2 mm, 3 mm, 4 mm, 5 mm, 6 mm, 7 mm, 8 mm, 0.9 mm, 10 mm, 11 mm, 12 mm, 13 mm, 14 mm, 15 mm, or ranges therebetween. In some embodiments, a pinning ledge extends 0.5-2 mm (e.g., 0.5 mm, 0.75 mm, 1 mm, 1.25 mm, 1.5 mm, 1.75 mm, 2 mm, or ranges therebetween) out into the air gap and above the airlock chamber. In some embodiments, no pinning ledges are present (e.g., no extension of the base layer above the airlock chamber. In some embodiments, the air gap across the airlock chamber is 3-8 mm (e.g., 3 mm, 4 mm, 5 mm, 6 mm, 7 mm, 8 mm, or ranges therebetween (e.g., 4-6 mm)). In some embodiments, the smallest distance between the pinning ledges is is 3-8 mm (e.g., 3 mm, 4 mm, 5 mm, 6 mm, 7 mm, 8 mm, or ranges therebetween (e.g., 4-6 mm)).

In some embodiments, "streaming" the PMPs (e.g., positioning the magnetic field a distance (e.g., 0.5 mm, 1 mm, 1.5 mm, 2 mm, 2.5 mm, 3 mm, 3.5 mm, 4 mm, 4.5 mm, 5 mm, or ranges therebetween) away from the liquid-air interface (e.g., above the airgap) and using the magnetic force pull PMPs out into the airgap) provides a clean sample transfer without significant undesired liquid carryover within the PMP pellet. Streaming the PMPs across the liquid/air interface, rather than dragging (e.g., with the magnet continuously positioned over a magnetically-induced pellet of PMPs), reduces elongation of the liquid/air interface and reduces the amount of undesired liquid carried-over with the PMPs into the air gap. In some embodiments, streaming is achieved by: (i) creating a magnetic field above a chamber (e.g., by placing a magnet near/against the opposite side of the transfer surface (e.g., drag film)) to pull the PMPs within the chamber into a pellet on the transfer surface, (ii) moving the magnetic field along the transfer channel to bring the pellet of PMPs near or adjacent to the air/liquid interface, (iii) reducing or eliminating the magnetic field experienced by the PMPs (e.g., by lifting the magnet away from the transfer surface (e.g., drag film), (iv) recreating the magnetic field within the air gap (e.g., by placing a magnet near/against the opposite side of the transfer surface), and (v) allowing the PMPs pelleted within the liquid to stream out of the liquid into the air gap. By streaming the PMPs across the interface, rather than dragging the entire pellet across, less liquid is carried over with the PMPs. Following streaming of the PMPs into the air gap, the PMPs may be dragged or streamed across the second liquid/air interface and into the next chamber.

In some embodiments, chambers and the channels, vents, ports, etc. connected thereto are configured such that flow between chambers/channels and/or hydrostatic pressure is inducible by reorienting the position of the device (e.g., rotating the device around an axis. For example, a device may reside in a planar (~0° rotation) orientation when heating sample, transferring PMPs along the transfer channel by magnetic force, etc.; in some embodiments, residing in the planar orientation reduces stress on the pinned liquid/air interfaces. However, rotating the device about the longitudinal axis (see FIG. 15B) by, for example, 10-90° (e.g., 10°, 20°, 30°, 40°, 50°, 60°, 70°, 80°, 90°, or ranges therebetween (e.g., 30-60°, etc.) allows for priming fluids and channels, compacts liquids within the chambers for PMP collection, transfers materials through channels, etc. In some embodiments, by switching the device between planar and rotated orientations (e.g., one or more times (e.g., 1, 2, 3, 5, 6, 7, 8, or more or ranges therebetween), various steps described herein (e.g., fluid transfer, channel priming, fluid compaction, PMP compaction, PMP transfer, PMP collection, mixing, etc.) are performed. In some embodiments, when the orientation of the cartridge is near vertical (e.g., <30°, <25°, <20°, <15°, <10°, or <5° off vertical), such that the force of gravity is applied across the width of the device, a hydrostatic head is generated to help fill the channels; this also impacts the pressure drop across the air/water interface. When the plane of the cartridge is near horizontal (aka "planar") (e.g., <30°, <25°, <20°, <15°, <10°, or <5° off vertical), the pressure drop is decreased which makes the air/liquid interface more stable, and less likely to break when particles are pulled across it. Rotation of the device provides the ability to have one interfacial pressure drop for filling and another for particle streaming.

In some embodiments, a channel between two chambers is linked to the bottom of a first chamber (e.g., lysis chamber) and to the top of a second chamber (e.g., hybridization chamber), when the device is in a first orientation (e.g., planar); this prevent flow of liquid through the channel when the device is in the first orientation. However, placing the device in a second orientation (e.g., rotated along the longitudinal axis) allows fluid to flow through the channel under the force of gravity (e.g., alone or with secondary pressure applied).

In some embodiments, sample and/or reagents are added to a chamber comprising an open top. In some embodiments, a cap or plug is secured to the top opening of the chamber. In some embodiments, the cap/plug comprises a plunger functionality, such that it can adopt two or more closed conformations (e.g., a raised (but still closed) conformation, a depressed conformation, etc.). In some embodiments, when the plunger cap is in the raised/closed conformation, the top of the chamber is sealed, but a vent near the top of the chamber is open to the air. In some embodiments, by virtue of the location of the vent near the top of the chamber (end the small size of the vent), significant rotation and/or shaking of the device will not result in liquid exiting the chamber through the vent. In some embodiments, when the plunger cap is depressed, the vent is sealed (in addition to the open top of the chamber), and therefor pressure is applied to the contents of the chamber; this pressure, forces the liquid within the chamber (e.g., comprising sample, reagents, buffer, etc.) to flow through a channel connecting the chamber sealed by the plunger cap into a subsequence chamber.

In some embodiments, one or more of the chambers of a device herein (e.g., lysis chamber, hybridization chamber, wash chamber, etc.) are oversized compared to the volume of liquid (e.g., sample, buffer(s), reagents, etc.). In some embodiments, the volume of a chamber is greater than (e.g., 1.2×, 1.4×, 1.6×, 1.8×, 2.0×, 2.2×, 2.4×, 2.6×, 2.8×, 3.0×, 3.5×, 4.0×, or more, or ranges therebetween (e.g., 1.6× to 2.6×)) the intended (or actual) volume of liquid (e.g., sample, buffer(s), reagents, etc.) contained therein. In some embodiments, the oversized chamber allows facilitation of mixing or resolubilization (of reagents, sample, PMPs, etc.) by rotation of the device (e.g., about the longitudinal axis (see FIG. 15B), about another axis) or shaking. In some embodiments, the oversized chamber volume and dimensions results in a large surface-to-volume ratio for the liquid within the chamber (e.g., particularly when the device is in the planar orientation), and thereby speed temperature changes (e.g., heating) of the liquids within the chamber.

In some embodiments, devices described herein, or components thereof, are disposable. In some embodiments, devices described herein, or components thereof, are intended to be used as a single-use, consumable. In some embodiments, the entire device is disposable. In some embodiments, materials for the device are selected to reduce costs due to the disposable nature of the device. In some embodiments, portions or components of a device are disposable (e.g., the chambers and/or plate comprising the chambers, the transfer surface, etc.), while other portions or components of a device are multi-use (e.g., frame, magnet assembly, etc.). In some embodiments, a single-use cartridge (e.g., comprising chambers, transfer surface, atolls, etc.) is inserted into a multi-use device (e.g., comprising a frame, magnet, mixing device, etc.). In some embodiments, an entire device is intended for multi-use.

Particularly in embodiments in which the device (or at least the chamber-portion of the device) is a consumable, the device or a portion thereof may be provided (e.g., purchased, provided to a user, etc.) with appropriate buffers and/or reagents (e.g., capture PMPs) pre-loaded into the chambers. In some embodiments, reagents may be provided in dry (e.g., lyophilized) form. In some embodiments, spillage during shipment, storage, handling, etc. is prevented by a cover that extends between the tops of the atolls. In some embodiments, this cover is removable. In some embodiments, the cover is a peelable foil laminate. In other embodiments, particularly in which the device (or at least the chamber-portion of the device) is reusable, a user fills the chambers with appropriate buffers and/or reagents (e.g., capture PMPs). In some embodiments, a user adds one or more buffers or reagents (e.g., capture PMPs) to the chamber(s) of a single-use device.

In some embodiments, one or more dried reagents are provided within a chamber. In some embodiments, a dried reagent is provided in the main cavity of the chamber, such that addition of liquid to the chamber results in suspension of the dry reagent in the liquid, if possible. In other embodiments, a reagent (liquid or dried) is contained within a secondary space of the chamber that is sealed from the main cavity. In such embodiments, the secondary space may be opened to allow mixing of the reagent with the materials of the main cavity of the chamber by any suitable method (e.g., dissolving the seal, breaking the seal, etc.) when desired. In some embodiments, buffer reagents, a lysing reagent, a binding reagent, PMPs, etc. may be provided in the main cavity of the chamber or in an unsealable compartment of the chamber.

In some embodiments, the extraction/isolation/purification of an analyte with the devices/methods herein relies on the attractive force between a magnet (e.g., placed adjacent to the opening of the chamber, on the distal side of the transfer surface, placed beneath the bottom of the chamber, etc.) and PMPs within the buffer in the chamber. In some embodiments, PMPs are nanoparticles or microparticles. Any suitable PMPs that can be readily collected (e.g., pelleted) against the transfer surface by application of a magnetic field on the distal side of the transfer surface may find use in embodiments herein. In some embodiments, PMPs display an appropriate capture agent for binding (e.g., non-covalently, covalently) to a target analyte. The capture agent may be a ligand for the analyte (e.g., small molecule or peptide ligand, etc.), an antibody, an antibody fragment, an antigen (e.g., when the analyte is an antibody), a nucleic acid (e.g., for capture of NA-binding proteins, for capture of complementary nucleic acids), an affinity molecule (e.g., biotin or streptavidin (e.g., for capture of streptavidin- or biotin-labeled analytes), GST or glutathione (e.g., for capture of glutathione- or GST-labeled analytes), etc.), etc. Embodiments herein are not limited by the identity of the capture agents, unless explicitly specified, and any analyte/capture-agent pairs known or understood in the field may find use herein.

In some embodiments, PMPs are mixed and/or resuspended in each chamber. In some embodiments, mixing is performed manually (e.g., hand shaking). In some embodiments, mixing is performed via mechanical means, e.g., sonication, magnetic streaming, mechanical shaker, etc. In some embodiments, an automated device, external to the devices described herein, is utilized to facilitate mixing.

In some embodiments, PMPs are transferred between chambers through the use of one or more magnets. In some embodiments, a magnet is placed on the distal side of the transfer surface to withdraw the PMPs from the chamber and collect them against the transfer surface. Any magnet of suitable size, shape and strength may be employed. In some embodiments, a user manually applies the magnet to the device. In some embodiments, a magnet is part of the device. In some embodiments, a cartridge described herein is place into a device comprising a magnet. In some embodiments, the magnet is moved manually by a user. In some embodiments, application of the magnet to the transfer surface and movement of the magnet between the chambers is automated. In some embodiments, the collection magnet is withdrawn from the transfer surface to allow the PMPs to enter the chamber they are aligned beneath. In some embodiments, a second magnet is employed to return PMPs from the transfer surface into a chamber. In some embodiments, the second magnet is placed at the bottom of the chamber and draws the PMPs from the transfer surface into the chamber.

In some embodiments, various method steps performed within a device are facilitated by changes in temperature of regions of the device. In some embodiments, a chamber (or portion thereof) or the sample therein may be heated (e.g., to 30° C., 35° C., 40° C., 45° C., 50° C., 55° C., 60° C., 65° C., 70° C., 75° C., 80° C., 85° C., 90° C., 95° C., or ranges therebetween) to facilitate, for example, mixing, dissolving a reagent, disassociation of an analyte and PMP, etc. In some embodiments, a chamber (or portion thereof) or the sample therein may be cooled (e.g., to 5° C., 10° C., 15° C., 20° C., 25° C., 30° C., 35° C., 40° C., 45° C., 50° C., 55° C., 60° C., 65° C., 70° C., or ranges therebetween) to, for example, facilitate binding of analyte to the PMPs, to prevent analyte degradation, etc. Any suitable heating or cooling mechanisms are within the scope herein. In some embodiments, a device utilizes only heating, and not any cooling mechanisms. In some embodiments, the absence of active cooling simplifies the hardware of the device. In some embodiments, heaters are pre-warmed (e.g., brought to temperature prior to introduction of sample or liquid reagents) to expedite processing.

In some embodiments, different chambers are maintained at different temperatures. For example, a lysing chamber (e.g., for lysing cells within a sample) may be maintained at temperature above 70° C. (e.g., 70° C., 75° C., 80° C., 85° C., 90° C., 95° C., or ranges therebetween), while a hybridization chamber (e.g., for formation of a complex between analyte and capture agents on the PMPs) is maintained at a temperature of 50-70° C. (e.g., 50° C., 55° C., 60° C., 65° C., 70° C., or ranges therebetween). In some embodiments, maintenance of different chambers at different temperatures, and performing different steps in different chambers, allows temperature-sensitive reagents to be stored (as liquids or dried) in an appropriate chamber without concern exposing them to high temperatures. For example, temperature-sensitive reagents for hybridization, are stored (e.g., dried or as liquids) in chamber 2 (or any hybridization chamber), without concern exposing them to high (e.g., 95° C.) temperatures in chamber 1 (or any lysis chamber).

In some embodiments, a sample is provided by a user, from which an analyte is to be extracted/isolated/purified. A sample may be of biological, environmental, or other origins. In some embodiments, an unprocessed sample is applied to the device. In some embodiments, one or more pre-processing steps (e.g., centrifugation, cell lysis, filtration, etc.) are performed before application of the sample to the device.

In some embodiments, the devices and methods herein employ one or more buffers for extraction/isolation/purification of analyte from sample. Buffers that find use in embodiments herein may include lysis buffer, analyte-binding buffer, nuclease buffer, protease buffer, wash buffer, elution buffer, etc. Buffers and solutions for these purposes are understood. In some embodiments, a particular set of buffers is provided depending upon the identity of the analyte and the type of sample.

In some embodiments, kits are provided comprising a device described herein along with appropriate buffers and PMPs (e.g., preloaded or in separate containers).

Materials for construction of the devices described herein are selected to optimize the particular features (e.g., lightweight, inexpensive, rigid, smooth, non-reactive, hydrophobic, thin, etc.) of each component of the device. Suitable materials include plastics, metals, films, membranes, etc. In some embodiments, components of the devices/systems herein comprise one or more plastics including but not limited to Bakelite, COP, COC, neoprene, nylon, PVC, polystyrene, polyacrylonitrile, PVB, silicone, rubber, polyamide, synthetic rubber, vulcanized rubber, acrylic, polyethylene, polypropylene, polyethylene terephthalate, polytetrafluoroethylene, gore-tex, polycarbonate, etc.; non-plastic components, such as glass, textiles (e.g., from animal, plant, mineral, and/or synthetic sources), etc.; TEFLON, HDPE, nylon, PEEK, PTFE, and/or PEBAX; or other suitable materials. In some embodiments, components of the devices/systems herein comprise one or more metals, including but not limited to aluminum, antimony, boron, cadmium, cesium, chromium, cobalt, copper, gold, iron, lead, lithium, manganese, mercury, molybdenum, nickel, platinum, palladium, rhodium, silver, tin, titanium, tungsten, vanadium, zinc, and alloys thereof.

EXPERIMENTAL

Example 1

Exemplary Device Fabrication and Assembly

Exemplary devices have been fabricated using a combination of 3D printed plastics (Protolabs, Maple Plain, Minn.), laser cut plastic parts, transfer adhesives (e.g., 3M 9472LE), and hydrophobic coatings (e.g., Aculon NanoProof 5.0, San Diego, Calif.). A four-chamber cartridge has been 3D printed from a plastic resin. The chambers are sealed on one end, allowing for buffer addition through the open end (FIG. 4).

Threaded inserts were heat-pressed into peripheral holes to facilitate assembly. A polycarbonate film (McMaster-Carr 85585K103) was adhesively bonded on a single face to 3M 9472LE adhesive transfer tape, and laser cut into circular atolls. The atolls are concentrically aligned with each of the four chambers and bonded to the cartridge surface.

Figure 6:
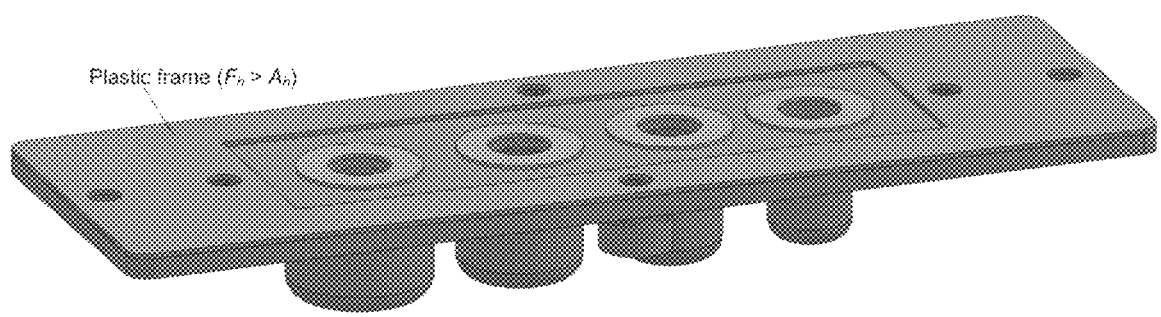
FIG. 6. A plastic frame is placed on top of the cartridge surface, where $F_h$ is slightly greater than $A_h$.
Figure 7:
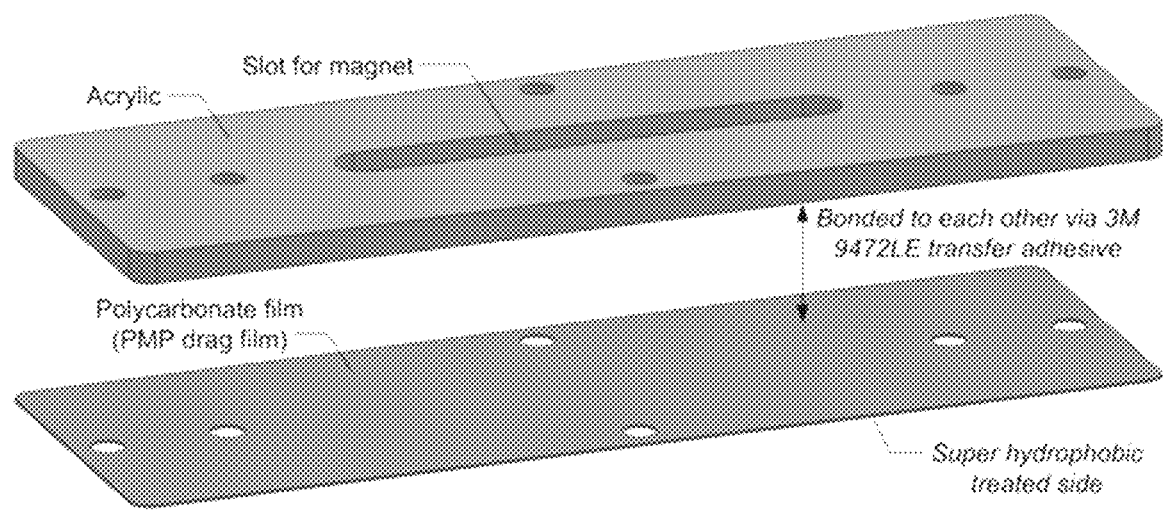
FIG. 7. One side of a thin polycarbonate film, e.g., PMP transfer film, is treated with a hydrophobic coating, and adhesively bonded to a laser-cut acrylic rigid backing. The acrylic piece has a slot for sliding a permanent magnet along the chamber openings to move the PMPs in the $G_h$ channel.

A plastic frame was laser-cut and placed on top of the cartridge surface (FIG. 6). A second thin polycarbonate film was coated on one face with Aculon's NanoProof 5.0 using a swab and allowed to dry for a minimum of 30 minutes. A 0.125" thick piece of clear acrylic (McMaster-Carr 8560K239) was adhesively bonded on a single face to 3M 9472LE adhesive transfer tape and laser-cut. The acrylic has a center slot along the length of the four chambers to guide the movement of a permanent cylindrical magnet (slot width slightly greater than magnet diameter) to move the PMP pellet. The acrylic provides structural rigidity and support to maintain $G_h$ (FIG. 7).

Figure 8:
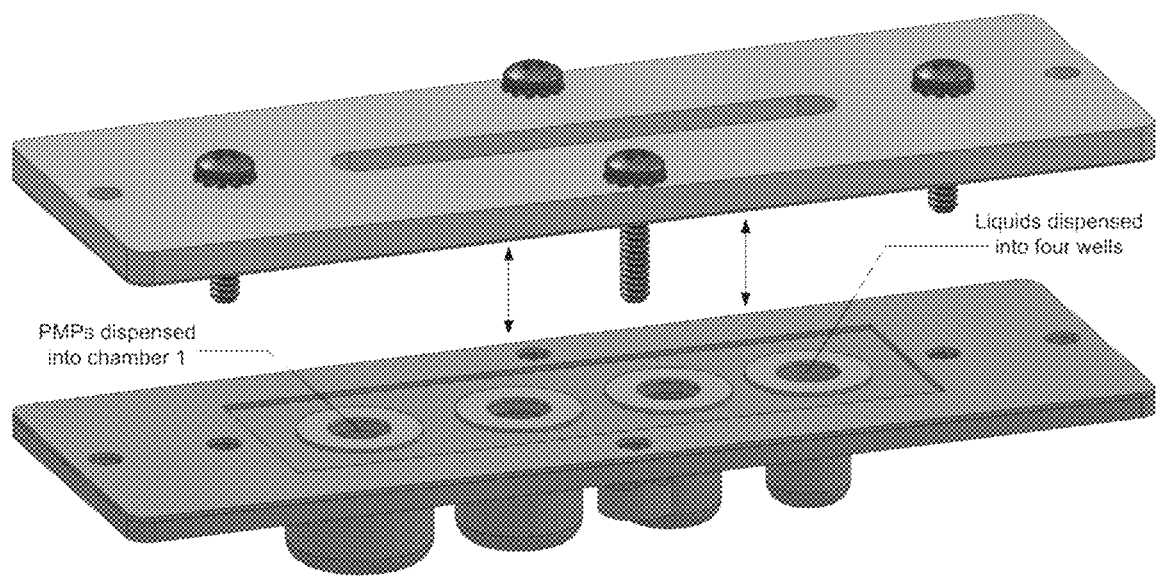
FIG. 8. Appropriate liquids are dispensed into each of the four chambers. The resuspended PMP suspension is also added into chamber 1. Finally, the acrylic+hydrophobic treated polycarbonate film assembly is assembled onto the cartridge using machine screws.

Before final assembly, the chambers were filled with the appropriate buffers and the resuspended PMP suspension using a precision pipettor. The acrylic+polycarbonate hydrophobic-treated PMP transfer film and acrylic frame were assembled to the cartridge using machine screws (FIG. 8).

Figure 9:
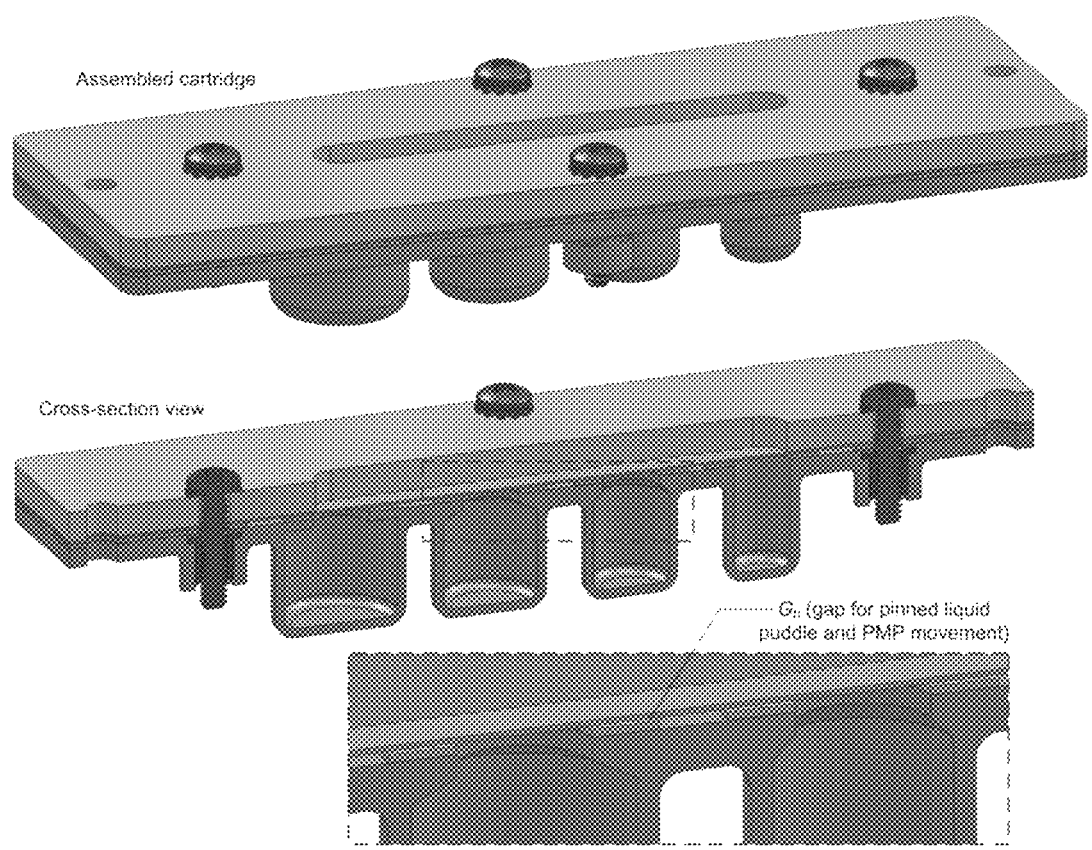
FIG. 9. (Top) Assembled TIMS cartridge. (Middle and bottom) Cross-section view of the assembled TIMS cartridge showing $G_h$, as created by the frame, hydrophobic treated polycarbonate film (i.e., PMP transfer film), and atolls.

A final assembled consumable cartridge is shown in FIG. 9.

Example 2

Exemplary Device Operation and Testing

Figure 10:
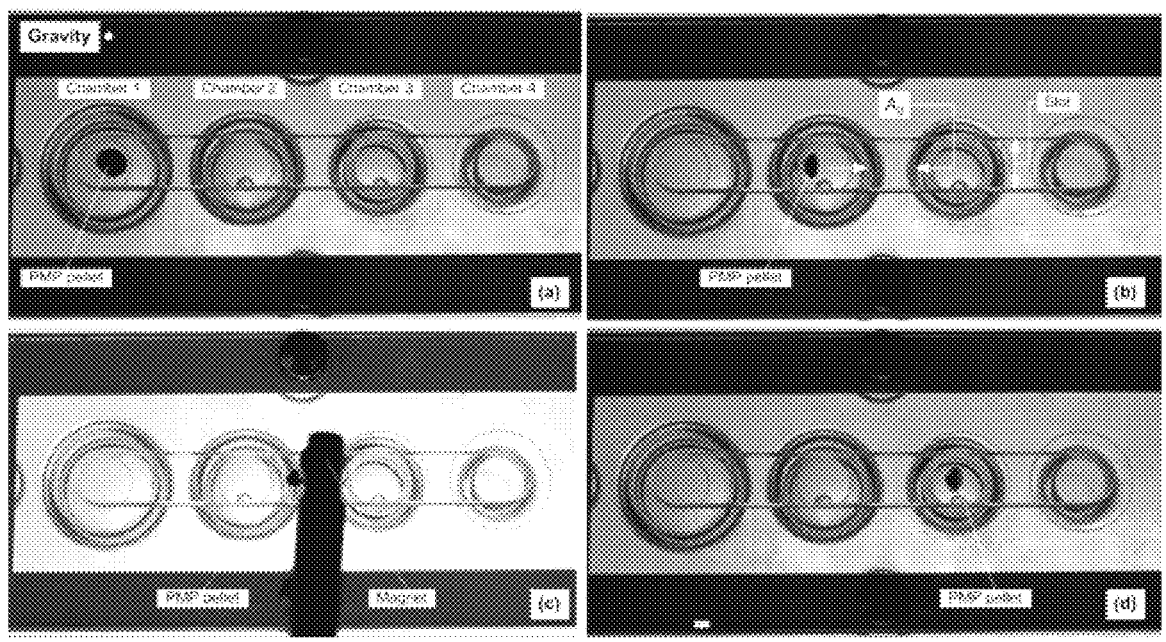
FIG. 10. Screenshots from a functionality test experiment with three buffers in the first three chambers (lysis, wash 1, and wash 2) while the cartridge was inverted (note the gravity vector). (a) PMPs are collected to the bottom of the hydrophobic-treated polycarbonate transfer film using a cylindrical magnet. (b-d) They are slowly moved to chamber 2 using the same magnet, and finally into chamber 3.

The functionality of the exemplary TIMS cartridge described in Example 1 was tested with three liquids in the first three chambers: lysis buffer, wash 1 (a mixture of detergents and alcohol), and wash 2 (alcohol and water solution). These fluids are highly wetting with very low contact angles on most surfaces. A resuspended PMP suspension was added to Chamber 1. A small cylindrical neodymium magnet (K&J Magnetics, Pipersville, Pa.) was used to collect the PMPs in chamber 1 onto the hydrophobic-treated polycarbonate film. The PMP pellet was slowly transferred through $G_h$ and into chamber 2. After some moments, the PMPs were again re-collected and transferred to chamber 3 (FIG. 10). Testing demonstrates that the liquids stay pinned at the outer edges of their respective atolls. Further, there is no liquid bridging during PMP movement. Liquid carryover (contamination) is minimized between chambers.

Example 3

Additional Design Elements

Figure 11:
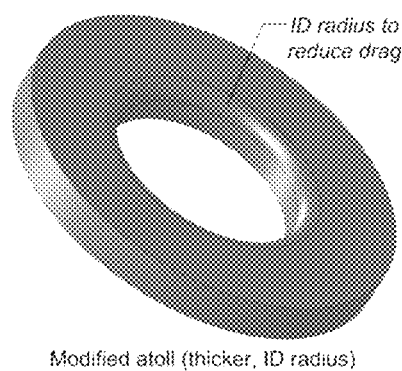
FIG. 11. A modified atoll which is thicker (per Equation 2), and has an ID radius to facilitate transfer during PMP collection and movement.

Experiments conducted using the exemplary device described in Example 1 have revealed alternative designs that may be incorporated into embodiments within the scope herein, improvements that may be integrated into the next prototype. For example, increased atoll height (e.g., taller frame) prevents liquid pools from breaking apart past the atolls; rounded ID edges on atolls facilitate PMP transfer; removal of 90° corner angles from internal chamber necks reduce PMP loss during collection; etc. While the PMPs are being transferred from one liquid chamber to the next, should a liquid droplet be pulled across into the air barrier, $A_h$ should be > the liquid pool height, $LP_h$, on a hydrophobic transfer surface, for a liquid with a 180° contact angle, as a worst-case scenario). This prevents the liquid from ever contacting the cartridge surface should this happen.

$$LP_h \approx 2\sqrt{\left(\frac{\sigma}{g\rho}\right)} \qquad \text{Equation 2}$$

where, $LP_h$=liquid pool height on hydrophobic transfer surface
σ=liquid surface tension
g=gravity
ρ=liquid density A sharp 90° edge on the ID of the atolls may lead to increased drag and/or shearing during PMP collection and lateral movement along $G_h$. To reduce the drag, a corner radius (e.g., fillet, chamfer, etc.) is added, in certain embodiments, to the ID of the atolls, while maintaining enough width ($A_w$) for sealing the foil laminate film. For example, when $G_h$ is approximately 0.005" (0.125 mm), the corner radius needed to reduce drag is not substantial (FIG. 11).

Figure 13:
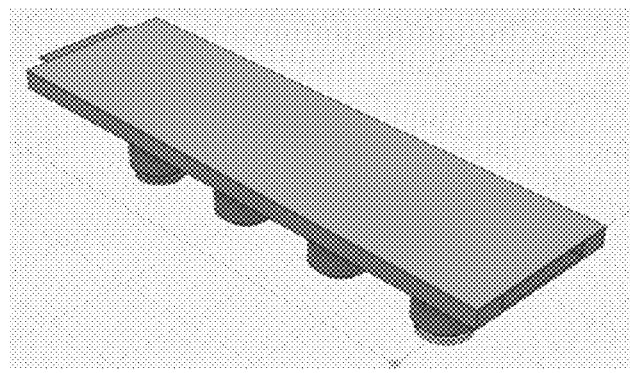
FIG. 13A-C. (A) Top perspective view of an exemplary cartridge, with transfer film covering the top of the device, foil laminate extending from one end of the device, and the chambers extending downward. (B) Cross-section perspective view revealing the chamber interiors; the bottoms of chambers 1 and 4 are plugged with a sample entry cap and elution cap, respectively; the bottoms of chambers 2 and 3 are sealed. (C) Cross-section perspective view of the exemplary device; the transfer film and foil laminate have been removed, revealing the chamber openings and atolls.
Figure 13:
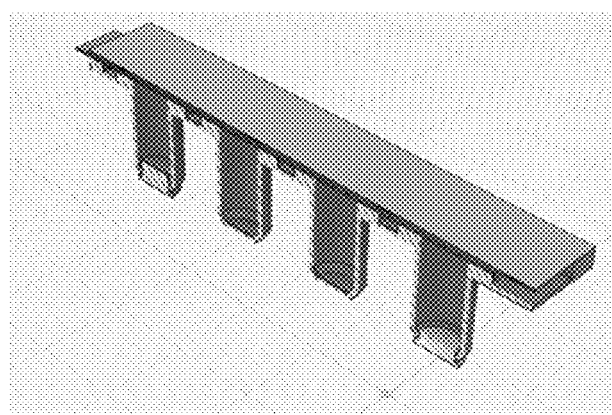
Figure 13:
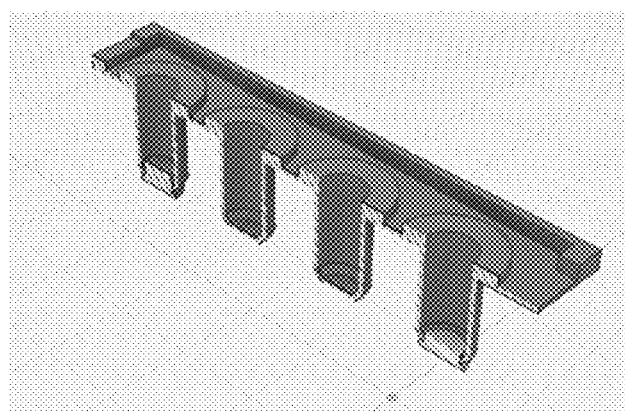

In some embodiments, devices comprise one or more of: (1) removable caps, lids, or other closure on one or more of the chambers; (2) liquid or dried reagent (e.g., lysing reagent, buffer, binding reagent, etc.) stored within one or more chambers (e.g., such that addition of liquid to the chamber results in resuspension of the reagent; or within an enclosure within the chamber, such that the enclosure must be opened or broken to resuspend the reagent); (3) regulated temperature zones (e.g., heaters, coolers, etc.), for example, to facilitate binding and/or release of analytes from PMPs; (4) asymmetric atoll shapes, for example, to facilitate collection of analyte and/or PMP collection; (5) a wicking pad, for example, to facilitate removal of analyte from the device; etc. Exemplary embodiment depicting a device comprising such features, and methods of use thereof, is depicted in FIGS. 13 and 14; however, these features may also find use separately and/or in combination with other elements described herein.

Example 4

Exemplary Cartridge

Elements of exemplary trans-interface magnetic separation (TIMS) device construction are depicted in FIG. 15A-F. Alternative configurations as well as combination of the elements depicted in FIG. 15 with other embodiments herein is contemplated. The layers and various features of the device exemplary TIMS device are described below.

Bottom Cover

A thin, rigid plastic film (e.g., polycarbonate, 0.010" thick) that is capable of withstanding high temperatures (e.g., 120° C.) for several minutes during the lysing and hybridization steps, which occur in chambers 1 and 2. The type and thickness of the film affect both fast heat transfer into the chambers (e.g., thinner results in more rapid heat transfer) and its inherent rigidity (e.g., contact resistance between the film and heaters).

Pressure Sensitive Adhesive (PSA) Bottom Cover

A double-faced pressure sensitive adhesive (e.g., 3M 9471, AR Care 7876) is used to bond the bottom cover to the injection molded cartridge body. The adhesive is usable at high temperatures (e.g., 120° C.) for short durations (several minutes). In lieu of the adhesive, the bottom cover may also be welded to the cartridge body, if materials are compatible.

Cartridge

Figure 15A:
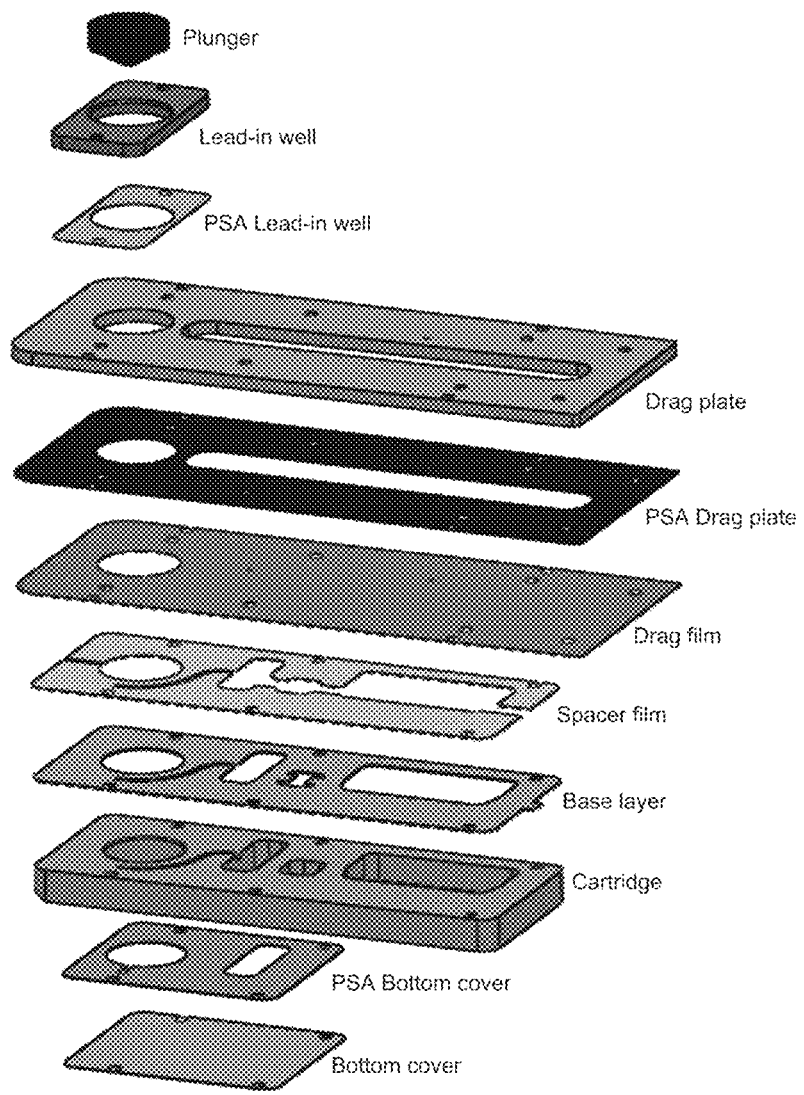
FIG. 15A. Layer by layer schematic of an exemplary sample preparation cartridge.
Figure 15B:
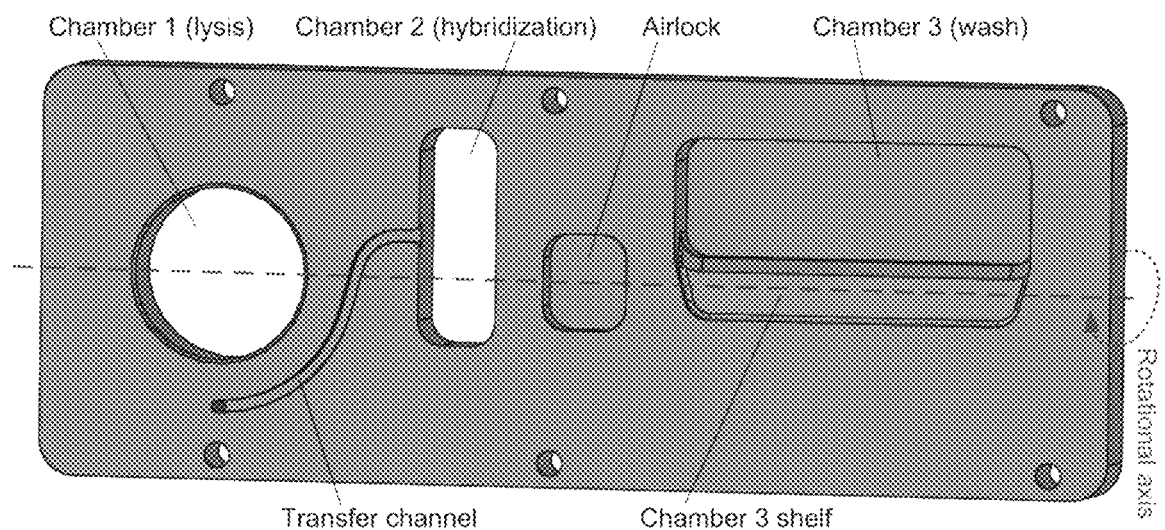
FIG. 15B. Schematic of an exemplary cartridge body for assembly into the exemplary cartridge of FIG. 15A.
Figure 17:
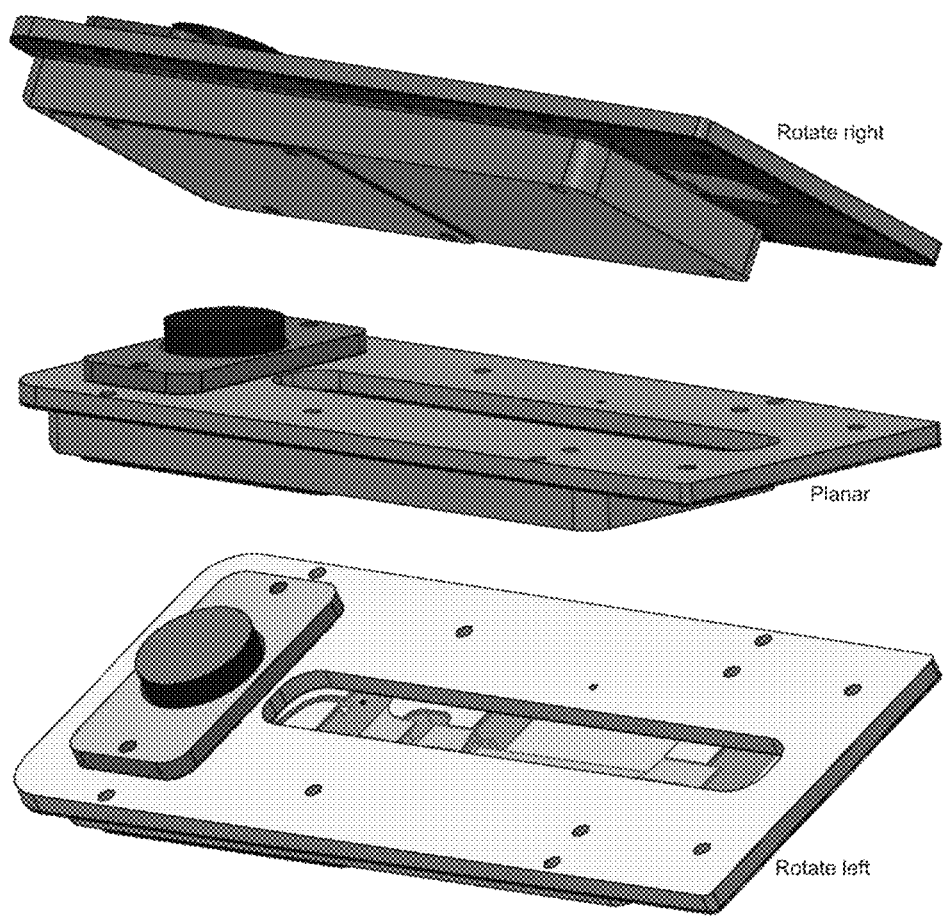
FIG. 17. Schematic showing an exemplary starting in a planar orientation (center image) and rotating left and right (e.g., ±10-45°) to facilitate mixing, resolubilize dried reagents, and facilitate uniform heat transfer into the fluid.
Figure 18A:
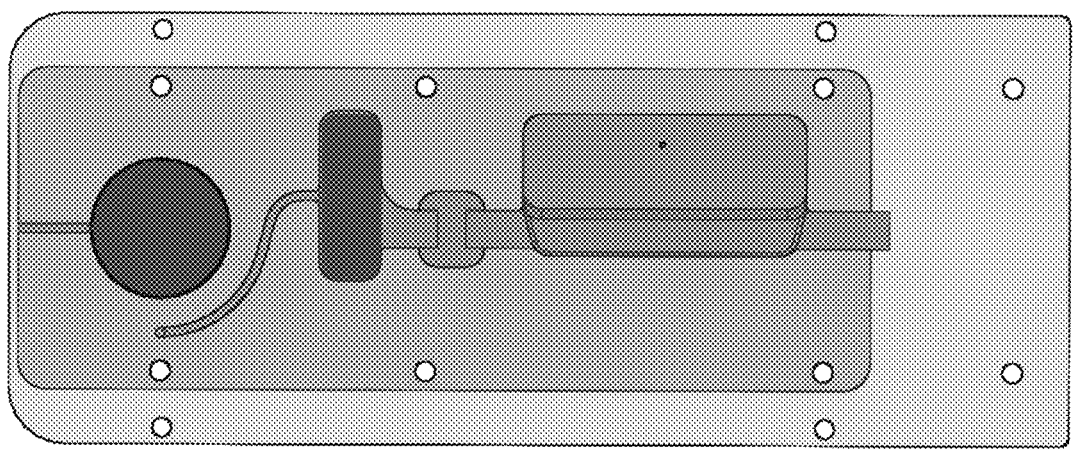
FIG. 18A. Top-view of an exemplary cartridge in planar orientation. When the fluid is in either chamber 1 or chamber 2, it spreads across the entire surface area, and is a very thin layer of liquid that facilitates rapid and efficient heat transfer.
Figure 18B:
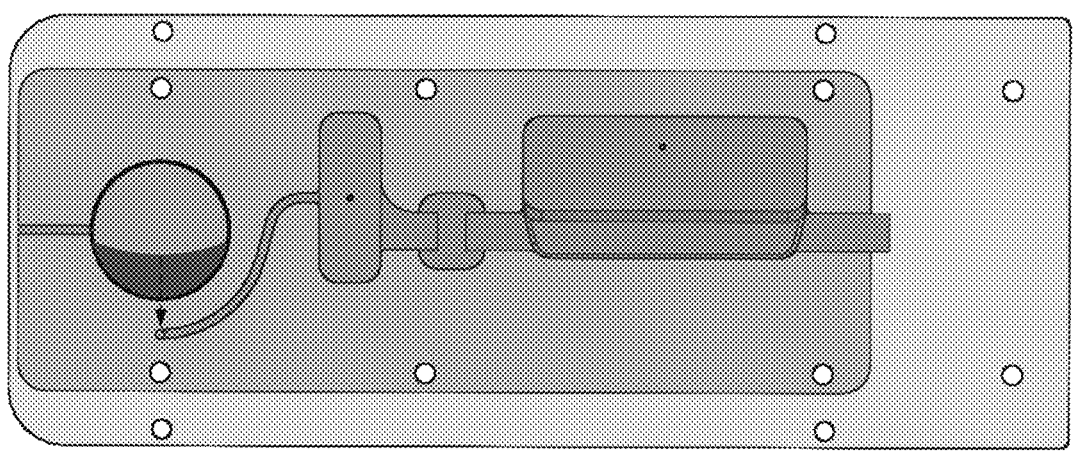
FIG. 18B. Top-view of an exemplary cartridge when rotated ~90°. The fluid in chamber 1 falls to the bottom of chamber 1, towards the Transfer Channel, and is ready for transfer to chamber 2.
Figure 18C:
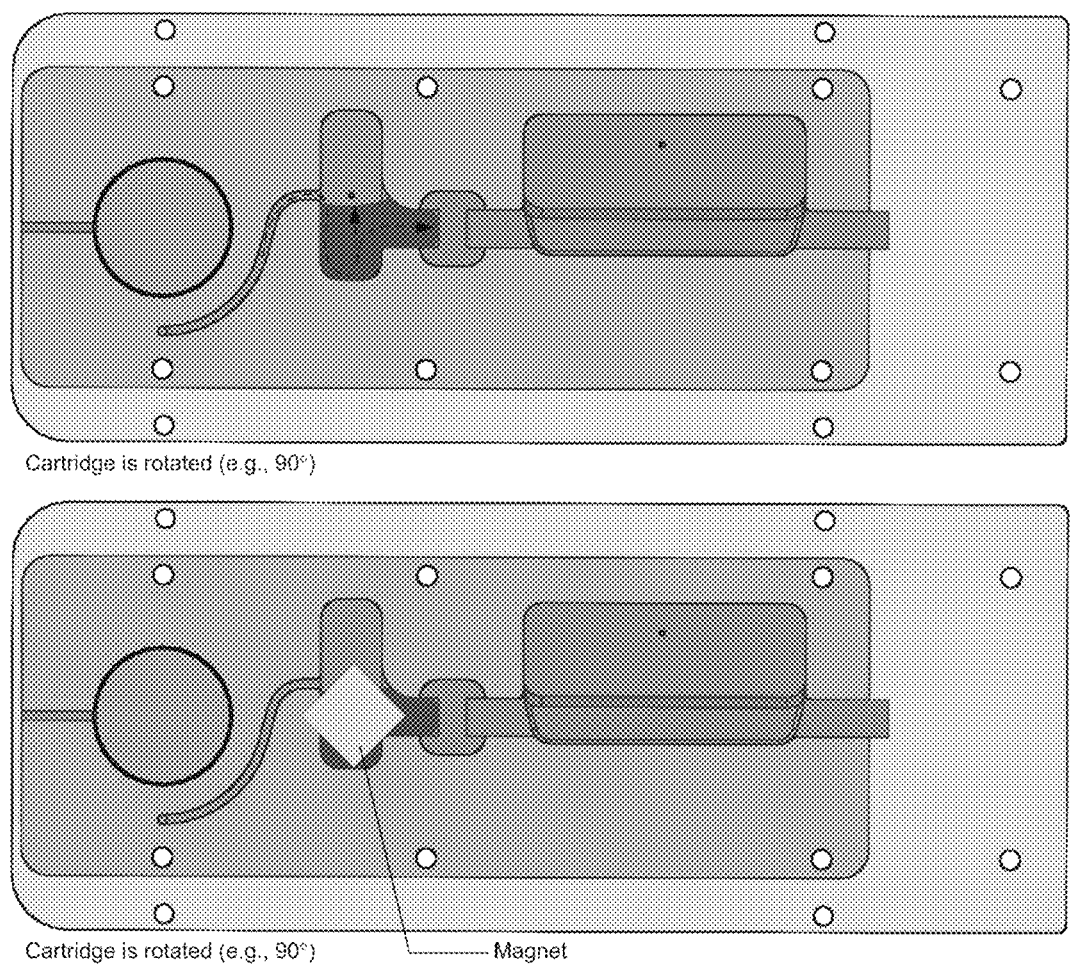
FIG. 18C. Top-view of exemplary cartridge when rotated ~90°: (Top image) when the fluid is transferred to chamber 2, it occupies a compact size, suitable for filling chamber 2 and priming the pinning ledge 1; (Bottom image) a magnet is positioned directly above the fluid volume facilitates faster/efficient PMP collection.

The single-use plastic cartridge can be injection molded from several plastics, such as polypropylene, polycarbonate, etc. It withstands high temperature (~120° C.) exposure for several minutes. It features, for example, 3 chambers for fluids, an airlock chamber, and a fluid transfer channel (FIG. 15B). The bulk of the wash reagent is pre-packaged in chamber 3 (in some embodiments, the reagent is contained within a foil blister which is punctured when inside the instrument, and the reagent flows out and into the chamber). A user introduces the patient sample into chamber 1 (~300 uL). Chambers 1 and 2 are oversized (e.g., 2-4× required volume) for several reasons: (a) maximize surface area of the fluid for fast heat transfer when cartridge is kept relatively planar; (b) leverage the ability to mix by rotating the cartridge along the axis shown which helps with resolubilizing dried reagents and uniform heat transfer (see FIG. 17); chamber 2 is designed such that 300 uL of fluid just barely reaches the outlet of the Transfer channel (see FIG. 16); and (c) achieve compact fluid volume by rotating the body out of plane.

Base Layer

Figure 15C:
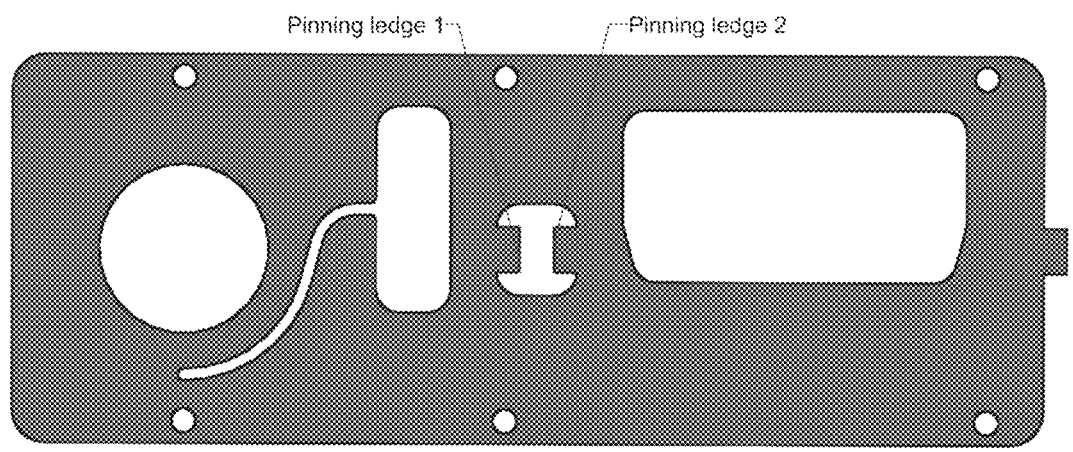
FIG. 15C. Schematic of an exemplary base layer for assembly into the exemplary cartridge of FIG. 15A.

This thin film (e.g., plastic film (e.g., a laminate of a PSA (e.g., 3M 9471) and rigid plastic, such as polycarbonate (e.g., 0.010" thick)) is attached (e.g., adhesively bonded) to the cartridge body and creates two pinning ledges (See FIG. 15C). Pinning ledge 1 pins the fluid in chamber 2, while pinning ledge 2 pins the wash reagent in chamber 3. The base layer gives flexibility in choosing the surface properties of the bottom of the fluid channel (e.g., it is not limited by the cartridge body plastic) and the ability to add surfactant coatings to make the bottom of the channel hydrophilic or hydrophobic.

Spacer Film

Figure 15D:
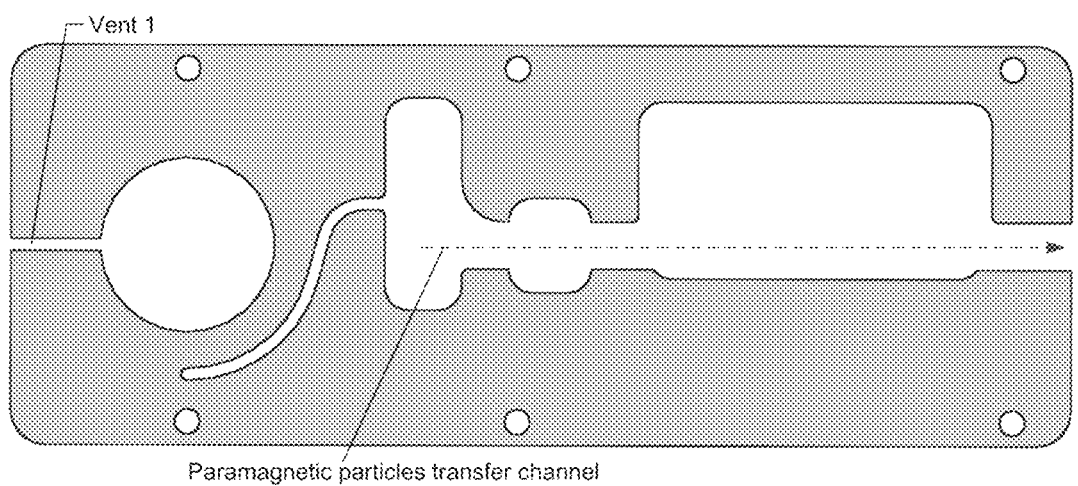
FIG. 15D. Schematic of an exemplary spacer film for assembly into the exemplary cartridge of FIG. 15A.

The spacer film (e.g., a laminate of PSA (e.g., 3M 9471, AR Care 7876), plastic (e.g., PET plastic 0.0075" thick), and PSA) defines the height of the fluid channel (e.g., ~0.0115") and is attached (e.g., adhesively bonded) to the base layer (See FIG. 15D). A vent is provided for chamber 1 during the lysing (heating) step. A paramagnetic particles (PMPs) transfer channel is available for collection, washing, and moving the PMPs from chamber 2 through chamber 3.

Drag Film

Figure 15E:
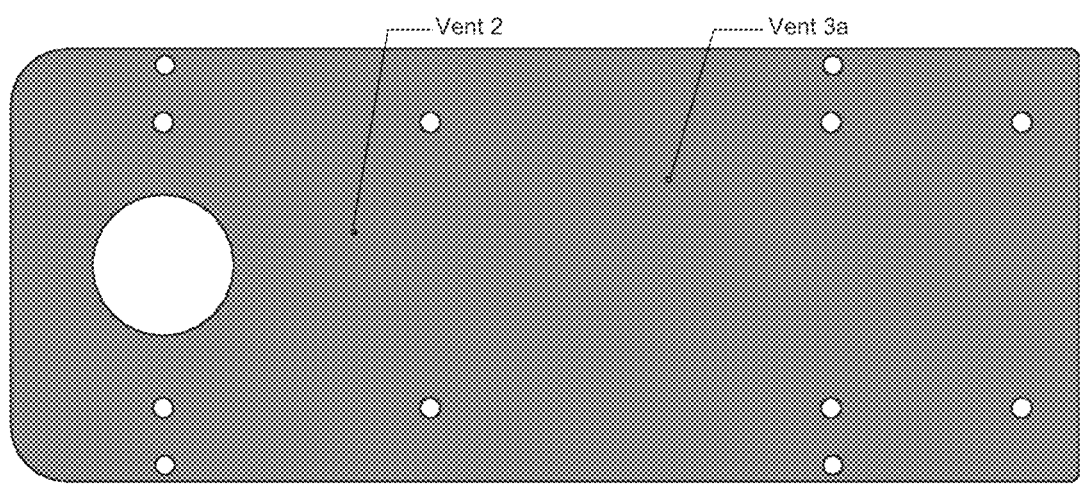
FIG. 15E. Schematic of an exemplary drag film for assembly into the exemplary cartridge of FIG. 15A.
Figure 15F:
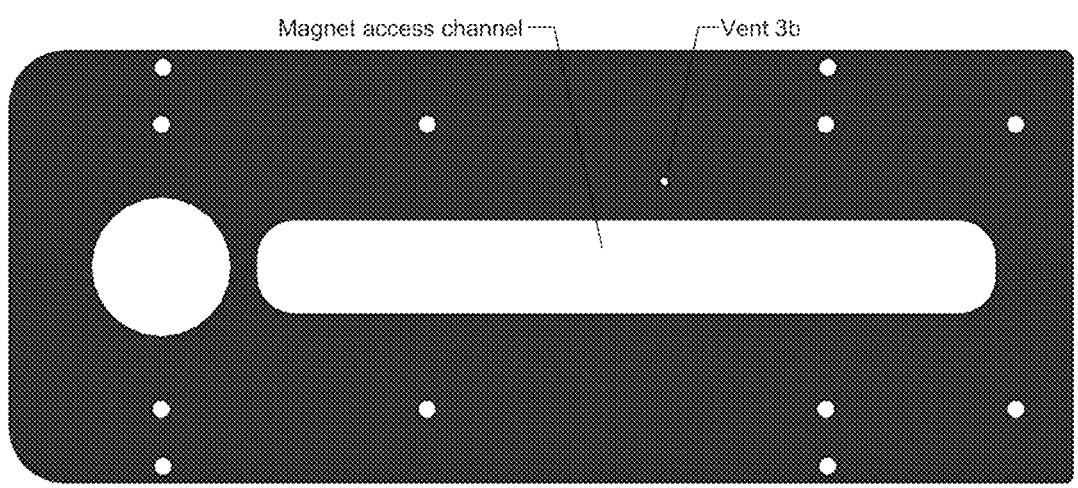
FIG. 15F. Schematic of exemplary PSA drag plate for assembly into the exemplary cartridge of FIG. 15A.

An exemplary drag film (e.g., a laminate of COP/COC plastic film, PSA (e.g., 3M 9471, AR Care 7876), and a rigid plastic support film (e.g., polycarbonate 0.010" thick)) is depicted FIG. 15E). In some embodiments, the COP/COC plastic film faces the inside of the fluidic channel, serving as the top-face of the channel. It is bonded to the second adhesive face of the spacer film. The two small vents are for chamber 2 (vent 2; air escapes during transfer of fluid from chamber 1 to chamber 2) and chamber 3 (vent 3a; air is replaced as the wash reagent flows out over the shelf and into the side-channels). The COP/COC film is coated with a super hydrophobic coating, such as Aculon NanoProof 5.0×, to help with efficient magnetic movement of PMPs. The plastic support film should be rigid, but also relatively thin to minimize the distance between a magnet on one side, and collection of PMPs on the other side.

PSA Drag Plate

This is a double-faced PSA (e.g., 3M 9471, AR Care 7876) which adhesively bonds the drag film to the drag plate. It has a single vent (3b) that overlaps with vent 3a and a magnet access channel (See FIG. 15F).

Drag Plate

This plate may be integrated with the cartridge body. It is assembled from, for example, a 3/32" plastic sheet and helps mate the cartridge body with the instrument. The drag plate slides on a rail in the instrument. It has the same features as the PSA drag plate (See FIG. 15F).

PSA Lead-In Well

This is a double-faced PSA (e.g., 3M 9471, AR Care 7876) which adhesively bonds the Lead-in Well to the drag plate.

Lead-In Well

This feature may be integrated with the cartridge body. In some embodiments, it is assembled from a 3/32" plastic sheet and acts as both an opening into chamber 1 and a lead-in for the plunger, which is used to close chamber 1 and subsequently push the fluid from chamber 1 into chamber 2.

Plunger

The plunger is, for example, a pliable rubber (e.g., plunger from a syringe body) that acts as both a cap for closing and sealing chamber 1, and subsequently can be pushed into chamber 1 to push the patient sample from chamber 1 into chamber 2 via the Transfer Channel.

Two-Chamber Front-End with Independent Heaters

As shown in FIG. 1513, the cartridge body has two chambers in the front: (a) chamber 1, for example, where lysing occurs (e.g., at 95° C.); and (b) chamber 2, for example, where hybridization occurs (e.g., at 60° C.). Separation of the two chambers presents several advantages: (a) independent heaters which can be pre-heated and stabilized at a fixed setpoint to help with fast heat transfer into the fluid via the Bottom Cover (FIG. 15A); therefore, heating-only devices are needed; no active cooling is required which simplifies the engineering hardware and expedites process time; and (b) dried reagents, which are sensitive to high temperatures experienced in chamber 1, may be stored separately in chamber 2 for use in the hybridization step.

Airlock

A small enclosed chamber (airlock) is positioned between the two pinning ledges 1 and 2 (see FIG. 15C). During use, first the wash reagent flows out of the deep well and over the shelf. It flows towards pinning ledge 2 and stays pinned there due to surface tension (created between the base layer and super hydrophobic-coated drag film). When the patient sample is transferred from chamber 1 to chamber 2 via the plunger, air can only escape via Vent 2 since Vent 1 is sealed by the plunger. As the fluid level rises in chamber 2, it immediately flows into the pinning ledge 1 due to capillary action. However, it does not go beyond pinning ledge 1 due to the airlock chamber (e.g., air cannot vent in that direction), which creates a stable liquid-air interface. The fluid continues to fill upward in chamber 2, stopping just short of reaching the Transfer Channel. The resultant is an air gap between the fluid in chamber 2 and wash reagent in chamber 3. PMPs are transferred across this liquid-air interface. See FIG. 16.

Example 5

HIV p24 Immunoassay

Experiments were conducted during development of embodiments herein to demonstrate the use of an exemplary TIMS cartridge (described in Example 4 and depicted in FIGS. 15-18) for immunoassay with HIV p24 ELISA testing plasma samples with 0 or 50 IU/ml [National Institute for Biological Standards and Controls (NIBSC) code 90/636, Potters Bar Hertfordshire, UK] compared to manual assay.

Reagents
  Capture antibody (115B-151): labeled using Chroma-Link™ Biotin Antibody Labeling Kit (TriLink Biotechnologies B-9007-105, San Diego, Calif.).
  Detection antibody (108-394): labeled with ThermoFisher FluoroMax 0.328 μM particles (cat #93470720011150) (Waltham, Mass.). First the particles were coated with BSA using N-hydroxysuccinimide ester formation followed by GMBS linkage between reduced mAb and BSA.
  Dynal M270 Streptavidin coated paramagnetic particles (PMPs) (ThermoFisher Scientific 65305)
  Antibody Dilution and Assay, & Wash Buffer
    1% BSA
    50 mM Tris, pH 7.5
    0.5% Triton×100
    200 mM NaCl
    0.02% $NaN_3$
  Elution Buffer
    100 mM glycine HCl, pH 2.74
    0.01% Tween 20

Reaction Conditions mAb: 50 ng biotinylated capture antibody and $7.0 \times 10^7$ Eu-conjugated detection antibody per reaction. 25 μl plasma samples containing either 0 or 50 IU/ml p24 (NIBSC 90/636) added to 190 μl binding buffer and 25 μl antibody cocktail plus 25 μl prewashed Dynal M270 Streptavidin coated PMPs added and incubated for 30 minutes with end-over-end mixing.

Manual Wash

Washed 2 times with 250 μl wash buffer; Collected on magnetic stand and discard supernatant TIMS Wash
  1. Sample was placed in chamber 2 of TIMS cartridge.
  2. PMPs were collected and transported from chamber 2 through airlock to wash chamber.
  3. Wash by moving magnet and allowing PMPs to catch up (streaming hops) 2 times
  4. Collected PMPs in wash and move out of wash chamber
  5. Resuspend PMPs in ~10 μl wash buffer and moved liquid to fresh tube
  6. Collect PMPs magnetically on magnetic stand
  7. Removed supernatant Elution for Both TIMS and Manual
  1. Add 125 μl elution buffer; pipet mix
  2. Incubate 5 minutes
  3. Pellet PMPs on magnetic stand and remove supernatant that contains the eluted protein
  4. Read fluorescence (Excitation@333 nm and Emission@613 nm on Biotek Synergy 4 Microplate Reader.)

| Processing method | 0 IU/ml p24 | 50 IU/ml p24 | Signal/noise* |
| --- | --- | --- | --- |
| Manual | 2331 | 7741 | 3.3 |
| TIMS | 261 | 1601 | 6.1 |

*50 IU/0 IU

TIMS wash removed substantially more unbound beads, resulting in a lower signal in both the 0 IU/ml and 50 IU/ml samples for TIMS compared to the manual assay, but nearly double signal to noise ratio for TIMS than manual.

Example 6

Affinity Protein Purification

Experiments were conducted during development of embodiments herein to demonstrate the use of an exemplary TIMS cartridge (described in Example 4 and depicted in FIGS. 15-18) in affinity protein purification. HIS-tagged protein was bound to MagneHis™ paramagnetic particles. The sample was split, and process (PMPs washed 3 times) manually or on the TIMS apparatus.

HSC70 labeled with N-terminal His tag and C-terminal via maleimide linkage to Alexa Fluor® 633 (ThermoFisher Scientific #A20342) Purify with MagneHis™ Kit (Promega) either on bench using magnetic stand or in TIMS prototype:
1. Added 20 µl labeled HSC70 to 280 µl MagneHis binding/wash buffer;
2. Mixed by pipetting up and down;
3. Added 10 µl MagneHis Ni particles to solution;
4. Incubated 2 minutes to bind;
5a. For manual process:
   Collected PMPs on magnetic stand for 30 seconds,
   Removed and discarded supernatant,
   Washed 3× in 150 µl wash buffer with PMP collection of 30 seconds,
   Add 20 µl elution buffer; pipet mixed,
   Incubated 2 minutes,
   Pelleted PMPs on magnetic stand and removed supernatant that contains the eluted protein, and
   Read in red channel of Rotor-Gene Q 5 Plex (excitation@625± and detection@660±10) Gain=5.33.
5b. For TIMS:
   Added protein mix containing PMPs to TIMS cartridge,
   Collected PMPs magnetically,
   Moved across airlock to wash chamber,
   Washed by moving magnet and allowing PMPs to catch up (streaming hops) 2 times,
   Collected PMPs in wash and moved out of wash chamber,
   Resuspended in ~10 µl wash buffer and moved liquid to fresh tube,
   Collected PMPs magnetically on magnetic stand,
   Discarded supernatant,
   Added 20 µl elution buffer; pipet mix,
   Incubated 2 minutes,
   Pelleted PMPs on magnetic stand and removed supernatant that contains the eluted protein, and
   Read in red channel of Rotor-Gene Q 5 Plex (excitation@625± and detection@660±10) 5 times and average reads. Gain=5.33

| Sample | Alexa 633 (RFU) |
| --- | --- |
| blank | 0.189 ± 0.004 |
| manual | 8.863 ± 0.192 |
| TIMS | 12.720 ± 0.056 |

TIMS produced higher yield of fluorescently labeled HSC70 to manual process.

All publications and patents listed below and/or provided herein are incorporated by reference in their entireties. Various modifications and variations of the described compositions and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

The invention claimed is:

1. A method of moving paramagnetic particles across a liquid/air interface, comprising:
   (a) providing a liquid sample comprising paramagnetic particles (PMPs);
   (b) creating a magnetic field within the liquid to form a pellet of the PMPs;
   (c) positioning the magnetic field to place the pellet within the liquid and adjacent to the liquid/air interface;
   (d) reducing or eliminating the magnetic field experienced by the PMPs;
   (e) creating a magnetic field on the air side of the liquid/air interface; and
   (f) allowing the pelleted PMPs to stream across the liquid/air interface into the airy wherein steps (a) through (f) are performed in order.

2. The method of claim 1, where a movable magnet located adjacent to a distal side of a transfer surface is used to pellet and stream the PMPs on a proximal side of the transfer surface.

3. The method of claim 2, wherein creating a magnetic field comprises placing the magnet near or against the distal side of the transfer surface.

4. The method of claim 3, reducing or eliminating the magnetic field experienced by the PMPs comprises moving the magnet away from the transfer surface.

5. The method of claim 1, wherein the PMPs display a capture agent on their surface.

6. The method of claim 5, wherein the capture agent is a nucleic acid probe, antibody or antibody fragment, or an affinity agent.

7. The method of claim 5, wherein the capture agent is bound to an analyte.

8. The method of claim 1, further comprising:
   (g) positioning the magnetic field to place the pellet within the air and adjacent to a air-liquid interface;
   (h) reducing or eliminating the magnetic field experienced by the PMPs;
   (i) creating a magnetic field on the liquid side of the air-liquid interface; and
   (f) allowing the pelleted PMPs to stream across the air-liquid interface into the liquid.

9. The method of claim 8, wherein the liquid of the liquid/air interface and the liquid of the air-liquid interface are different liquids.

* * * * *